United States Patent
Limpibunterng et al.

(10) Patent No.: US 8,229,629 B2
(45) Date of Patent: Jul. 24, 2012

(54) VEHICLE STEERING CONTROL SYSTEM AND CONTROL METHOD THEREFOR

(75) Inventors: Theerawat Limpibunterng, Susono (JP); Takahiro Kojo, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 523 days.

(21) Appl. No.: 12/441,433

(22) PCT Filed: Sep. 14, 2007

(86) PCT No.: PCT/IB2007/002665
§ 371 (c)(1),
(2), (4) Date: Mar. 16, 2009

(87) PCT Pub. No.: WO2008/032197
PCT Pub. Date: Mar. 20, 2008

(65) Prior Publication Data
US 2009/0276121 A1 Nov. 5, 2009

(30) Foreign Application Priority Data
Sep. 15, 2006 (JP) .................................. 2006-251849

(51) Int. Cl.
*A01B 69/00* (2006.01)
(52) U.S. Cl. .......................................... 701/41; 477/76
(58) Field of Classification Search .................. 701/41; 477/76
See application file for complete search history.

(56) References Cited

U.S. PATENT DOCUMENTS

| | | | | |
|---|---|---|---|---|
| 4,771,843 A | * | 9/1988 | Shimizu | 180/446 |
| 4,771,845 A | * | 9/1988 | Shimizu | 180/446 |
| 6,393,357 B1 | * | 5/2002 | Holmes et al. | 701/115 |
| 7,189,187 B2 | * | 3/2007 | Nakayashiki et al. | 477/159 |
| 7,747,366 B2 | * | 6/2010 | Karlsson | 701/35 |
| 2004/0222037 A1 | | 11/2004 | Takatsuka et al. | |
| 2005/0252497 A1 | * | 11/2005 | Yasui et al. | 123/697 |
| 2006/0213461 A1 | * | 9/2006 | Hayami | 123/41.15 |

FOREIGN PATENT DOCUMENTS

| | | |
|---|---|---|
| JP | 62 251274 | 11/1987 |
| JP | 63 151578 | 6/1988 |
| JP | 5 229445 | 9/1993 |
| JP | 2002 53050 | 2/2002 |
| JP | 2002 308127 | 10/2002 |
| JP | 2003 285752 | 10/2003 |
| JP | 2004 352090 | 12/2004 |
| JP | 2005 319824 | 11/2005 |
| JP | 2008 18860 | 1/2008 |

OTHER PUBLICATIONS

Russian Office Action issued Sep. 10, 2010, in Patent Application No. 2009109154, filed Sep. 14, 2007 (with English-language translation).

* cited by examiner

*Primary Examiner* — Behrang Badii
*Assistant Examiner* — Shardul Patel
(74) *Attorney, Agent, or Firm* — Oblon, Spivak, McClelland, Maier & Neustadt, L.L.P.

(57) ABSTRACT

A vehicle steering control system that controls the operation of an electric vehicle steering device, which applies a steering assist force to a steering mechanism via a gear mechanism and includes: a temperature estimating section for estimating the temperature of or around the gear mechanism; and a correcting section for correcting the steering assist force according to the estimated gear temperature.

16 Claims, 13 Drawing Sheets

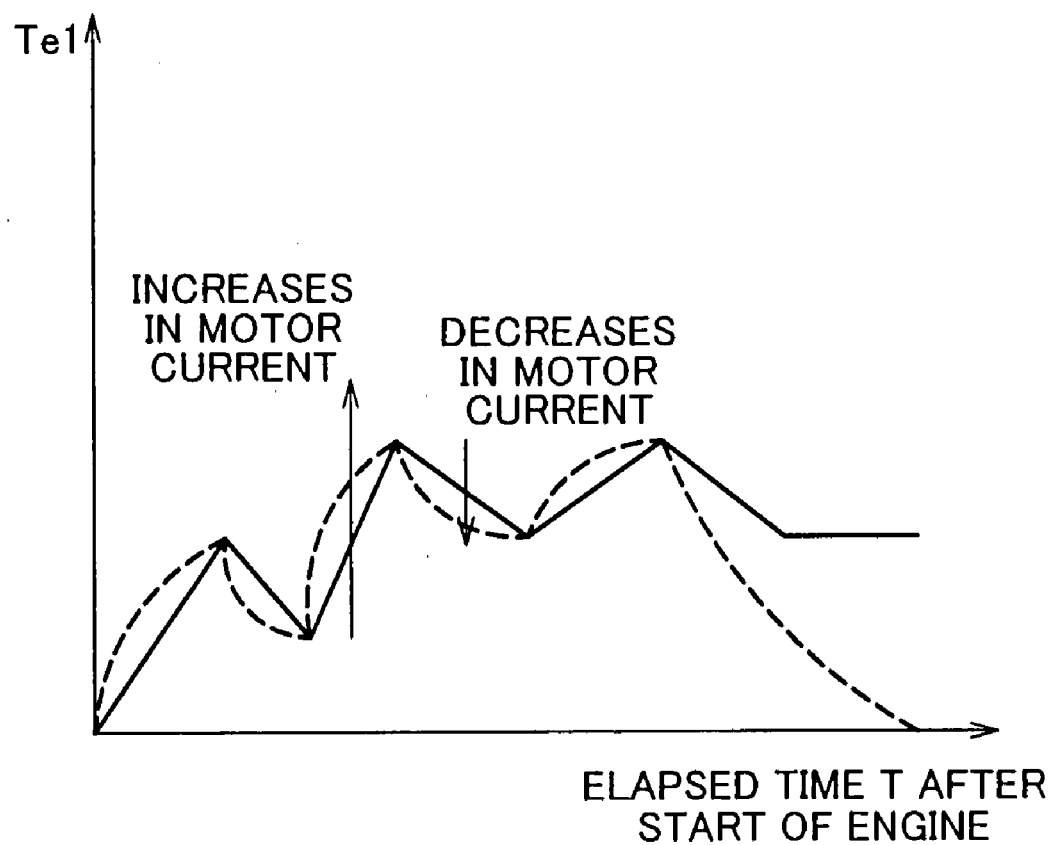

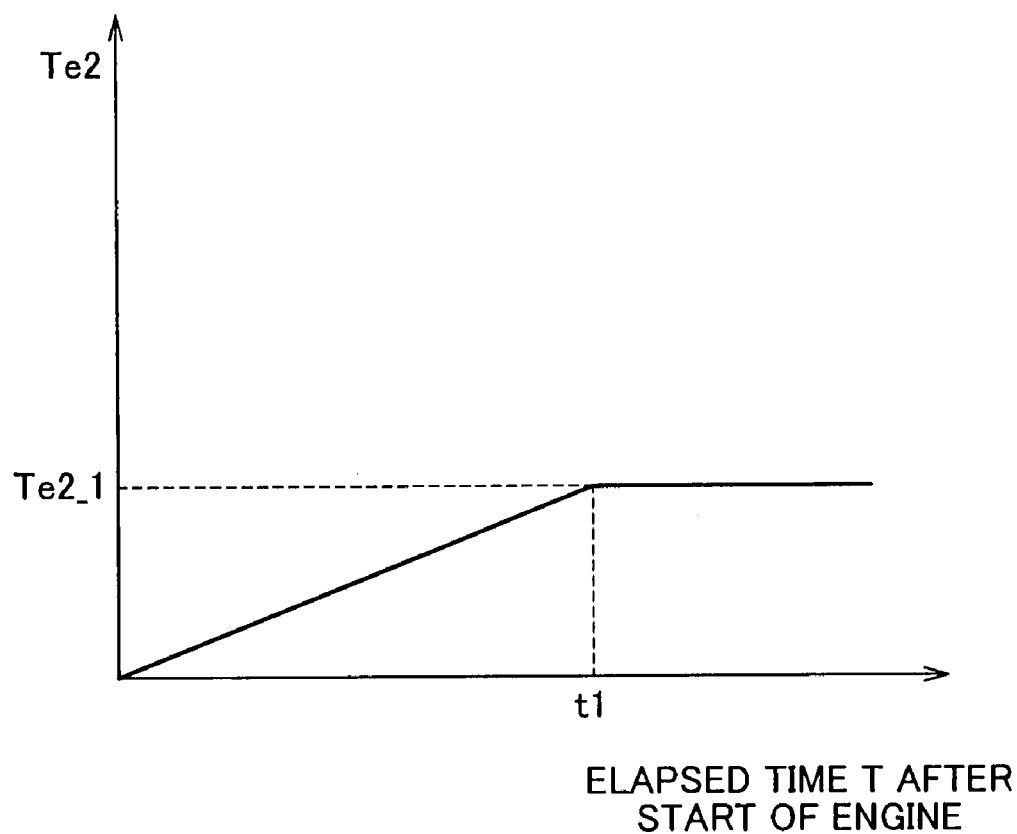

TEMPERATURE CHANGE Te3 CAUSED
BY CONVECTIVE HEAT FROM RADIATOR

F I G. 13
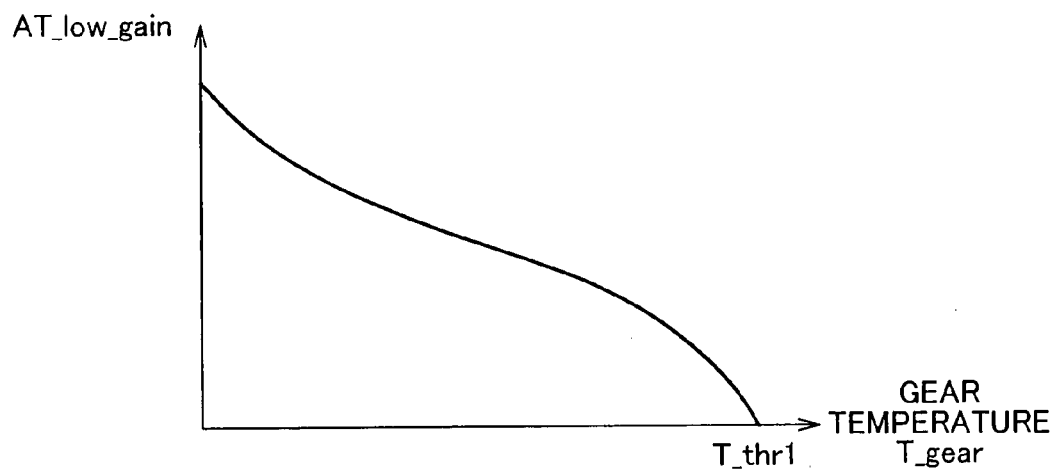
F I G. 14
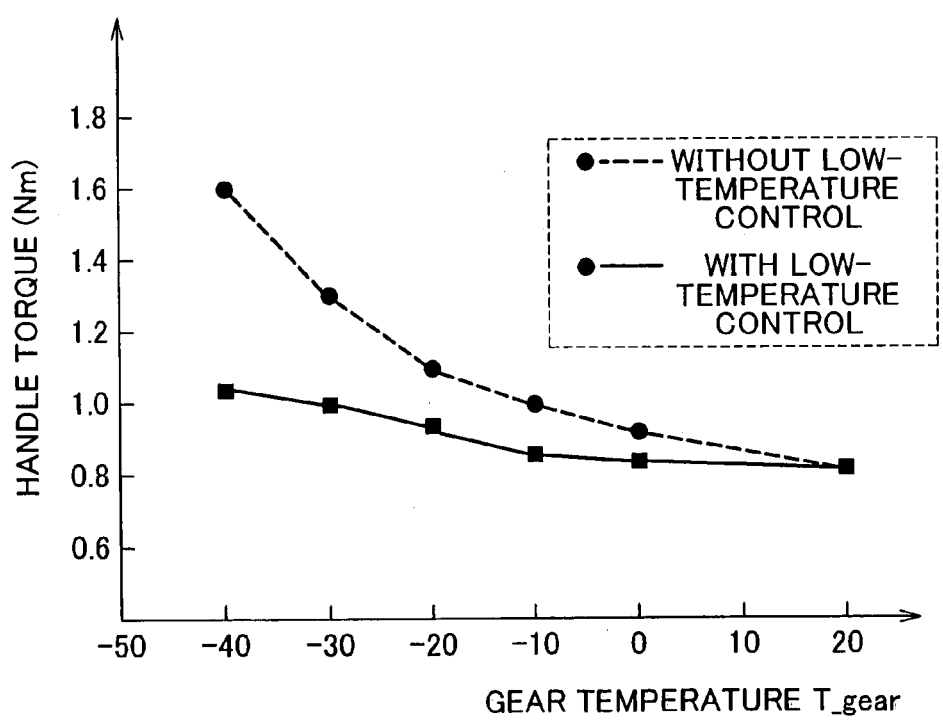

VEHICLE STEERING CONTROL SYSTEM AND CONTROL METHOD THEREFOR

BACKGROUND OF THE INVENTION

1. Field of the Invention

The present invention relates to a vehicle steering control system and a control method therefor. In particular, the present invention relates to a control device that controls the operation of an electric power steering device.

2. Description of the Related Art

In vehicles such as automobiles, an electric power steering device, which drives an electric motor in response to the steering torque applied to the steering wheel by the driver, applies a steering assist force to a steering mechanism including the front wheels. Such an electric power steering device has a speed reducer for reducing the rotational speed of the electric motor for outputting the steering assist force, and a gear mechanism, such as a rack-and-pinion mechanism. A grease is applied to the gear mechanism to improve the movability of the gear mechanism. It is known that the viscosity of the grease increases upon exposure to a low temperature (in particular, a temperature below freezing). When the viscosity of the grease increases, the preload of the gear mechanism increases and the steering wheel becomes heavy to turn. This is not preferred because the steering feel for the driver is adversely affected.

To solve the problem, a viscosity coefficient related value related to a viscosity coefficient of the steering system is estimated and the steering assist force is increased by correcting it according to an increase in the viscosity coefficient related value and the steering angular speed in the technology described in JP-A-2003-285752. Then, when the viscosity of the grease has increased, the steering assist force can be compensated. JP-A-2004-352090 describes a technology in which a current is passed through a d-axis when the environmental temperature of the gear mechanism is below a prescribed value. The temperature of the electric motor is thereby increased, which decreases the viscosity of the grease.

However, because the viscosity of grease increases depending on temperature, it is considered possible to let the driver have more natural steering feel by correcting the steering assist force using the temperature directly. On the other hand, providing another temperature sensor in the gear mechanism is not necessarily the best option because it requires the cost relating to the space in which the temperature sensor is installed and the cost for changing the configuration of the existing hardware to be connected to the temperature sensor in addition to the cost of the temperature sensor itself.

Also, a rack coaxial type power steering device in which the rotation of an electric motor is converted into reciprocating motion of a rack bar by a ball screw, in particular, tends to generate noise due to vibration of the ball screw. To reduce noise in an ordinary temperature range, the vibration of the ball screw needs to be reduced. In this case, however, the friction increases and results in degradation of steering feel in a low temperature range. That is, when priority is given to the steering feel in a low temperature range by such a method, the problem of noise in an ordinary temperature range occurs.

SUMMARY OF THE INVENTION

The present invention provides a vehicle steering control system that reduces degradation (change) of the steering feel under low temperature conditions at low cost and a control method therefor.

A first aspect of the present invention relates to a vehicle steering control system. The vehicle steering control system controls operation of an electric vehicle steering device, which applies a steering assist force to a steering mechanism via a gear mechanism. The vehicle steering control system includes a temperature estimating section for estimating a gear temperature as a temperature of or around the gear mechanism; and a correcting section for correcting the steering assist force according to the estimated gear temperature.

In the vehicle steering control system according to the first aspect of the present invention, the steering assist force determined by operation of the steering wheel by the driver and supplied from an electric motor is applied to the steering mechanism via a gear mechanism such as a reduction gear or a rack-and-pinion mechanism. The force the driver must apply to turn the steering mechanism is thereby reduced.

In particular, a gear temperature as the temperature of the gear mechanism or the temperature around the gear mechanism is estimated using a calculation method, described later, by operation of the temperature estimating section. Here, the "temperature of the gear mechanism" literally means the temperature of the gear mechanism itself, and the "temperature around the gear mechanism" means the temperature of the environment around the gear mechanism (for example, the air around the gear mechanism or the case in which the gear mechanism is housed). The "temperature of the gear mechanism" is substantially the same as the "temperature of the gear mechanism."

The steering assist force to be applied to the steering mechanism is corrected according to the gear temperature estimated by the temperature estimating section by operation of the correcting section. For example, when the gear temperature estimated by the temperature estimating section is equal to or lower than a prescribed temperature (more specifically, the gear temperature is low), the steering assist force that is applied to the steering mechanism is corrected by operation of the correcting section. When the gear temperature is low, because the viscosity of grease or the like applied to the gear mechanism increases, the preload of the gear mechanism increases. This is not desirable because it degrades the steering feel for the driver (for example, a phenomenon in which the steering wheel is heavy to turn or does not return smoothly). Therefore, more specifically, the steering assist force is increased by operation of the correcting section.

As described above, in the vehicle steering control system according to the first aspect of the present invention, when the gear temperature is at or below a prescribed temperature, a steering assist force greater than that applied when the gear temperature is above the prescribed temperature is applied to the steering mechanism. Therefore, even when the preload of the gear mechanism increases with an increase in the viscosity of grease or the like applied to the gear mechanism, the degradation of the steering feel for the driver is minimized.

In addition, because the gear temperature is estimated using various parameters detectable in the existing hardware configuration instead of directly detecting the gear temperature, the costs relating to the expense and space necessary to employ the constitution of the present invention can be reduced.

In order to prevent degradation of the steering feel at a low temperature, the "prescribed value" in the present invention may be determined based on the temperature at which the preload of the gear mechanism begins to increase with an increase in the viscosity of the grease or the like applied to the gear mechanism. For example, the temperature at which the preload of the gear mechanism begins to increase with an increase in the viscosity of the grease or the like applied to the gear mechanism may be determined as the prescribed value. Alternatively, the temperature at which the preload of the gear mechanism increases by a predetermined amount with an increase in the viscosity of the grease or the like applied to the gear mechanism may be determined as the prescribed value.

The temperature estimating section may estimate the gear temperature based on convective heat from the radiator. More specifically, the temperature estimating section may estimate the gear temperature based on convective heat supplied from the radiator to the gear mechanism.

According to this aspect, because the gear temperature may be estimated based on convective heat from the radiator, which has a large influence on an increase or decrease in the gear temperature, the gear temperature can be accurately estimated.

In the vehicle steering control system, in which the gear temperature is estimated based on convective heat from the radiator as described above, the temperature estimating section may estimate the gear temperature by estimating an amount of change in the gear temperature caused by convective heat from the radiator based on at least one of the engine speed, the vehicle speed and the coolant temperature as a temperature of coolant for cooling the internal combustion engine.

In this configuration, an amount of change in the gear temperature caused by convective heat from the radiator may be estimated based on the engine speed, the vehicle speed and the coolant temperature, which may be factors that determine the amount of convective heat from the radiator. Therefore, the amount of change in the gear temperature caused by convective heat from the radiator can be estimated with high accuracy, and, consequently, the gear temperature may be accurately estimated.

The temperature estimating section may estimate the gear temperature based on self-heating of an electric motor for applying the steering assist force. More specifically, the temperature estimating section may estimate the gear temperature based on self-heating heat supplied from an electric motor for applying the steering assist force to the gear mechanism.

In the vehicle steering control system, since the gear temperature can be estimated based on self-heating of the electric motor having a large influence on an increase or decrease in the gear temperature, the gear temperature can be estimated with high accuracy.

In the vehicle steering control system, in which the gear temperature is estimated based on self-heating of the electric motor as described above, the temperature estimating section may estimate the gear temperature by estimating an amount of change in the gear temperature caused by self-heating of the electric motor based on a motor current supplied to the electric motor.

In this configuration, the amount of change in the gear temperature caused by self-heating of the electric motor can be estimated based on the motor current which may be a factor that determines the amount of heat generated by self-heating of the electric motor. Therefore, the amount of change in the gear temperature caused by self-heating of the electric motor can be estimated with high accuracy, and, consequently, the gear temperature can be estimated with high accuracy.

The temperature estimating section may estimate the gear temperature based on radiant heat from the internal combustion engine. More specifically, the temperature estimating section may estimate the gear temperature based on radiant heat supplied from the internal combustion engine to the gear mechanism.

According to the vehicle steering control system, because the gear temperature may be estimated based on radiant heat from the internal combustion engine having a large influence on an increase or decrease in the gear temperature, the gear temperature can be estimated with high accuracy.

In the vehicle steering control system, the temperature estimating section may estimate the gear temperature by estimating an amount of change in the gear temperature caused by radiant heat from the internal combustion engine based on elapsed time after the start of the internal combustion engine.

In this configuration, the amount of change in the gear temperature caused by radiant heat from the internal combustion engine is estimated based on the elapsed time after the start of the internal combustion engine, which may be a factor that determines the amount of radiant heat from the internal combustion engine. Therefore, the amount of change in the gear temperature caused by radiant heat from the internal combustion engine can be estimated with high accuracy, and, consequently, the gear temperature can be estimated with high accuracy.

The temperature estimating section may estimate the gear temperature based on ambient temperature.

According to the vehicle steering control system, because the gear temperature can be estimated based on the ambient temperature having a large influence on an increase or decrease in the gear temperature, the gear temperature can be estimated with high accuracy.

The correcting section may correct the steering assist force by adding a low-temperature correcting assist force determined according to the gear temperature to a usual assist force as a steering assist force which is applied when the gear temperature is higher than a prescribed value.

According to this vehicle steering control system, when the gear temperature is equal to or below a prescribed temperature, a steering assist force greater than that which is applied when the gear temperature is above the prescribed temperature is applied to the steering mechanism because a low-temperature correcting assist force is added to a usual assist force. Therefore, even when the preload of the gear mechanism is increased with an increase in the viscosity of grease or the like applied to the gear mechanism, the degradation of the steering feel for the driver is reduced.

In the vehicle steering control system, the correcting section may correct the steering assist force by increasing the low-temperature correcting assist force as the gear temperature is lower.

The lower the gear temperature is, the more the viscosity of the grease or the like applied to the gear mechanism increases and the more the preload of the gear mechanism increases. Therefore, when the vehicle steering control system is configured as above, a greater steering assist force may be applied at lower gear temperatures. As a result, degradation of the steering feel for the driver can be more effectively reduced.

A second aspect of the present invention relates to a method for controlling a vehicle steering control system for controlling operation of an electric vehicle steering device which applies a steering assist force to a steering mechanism via a gear mechanism. The control method includes: estimating either the gear temperature or the temperature around the gear mechanism; and correcting the steering assist force according to the estimated gear temperature.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6 is a graph conceptually illustrating the amount of change in the gear temperature caused by self-heating of the electric motor.

FIG. 7 is a graph conceptually illustrating the amount of change in the gear temperature caused by radiant heat from the engine.

FIG. 13 is a graph for use in calculating a gain by which an assist torque is multiplied when the low-temperature correcting assist torque is calculated.

FIG. 14 is a graph in which the torque of the steering wheel in the case where the low-temperature correcting assist torque according to the embodiment is added and the torque of the steering wheel when the low-temperature correcting assist torque according to the embodiment is not added are shown in relation to the gear temperature.

DETAILED DESCRIPTION OF EMBODIMENTS

Description is hereinafter made of the best mode for carrying out the invention with reference to the drawings.

Figure 1:
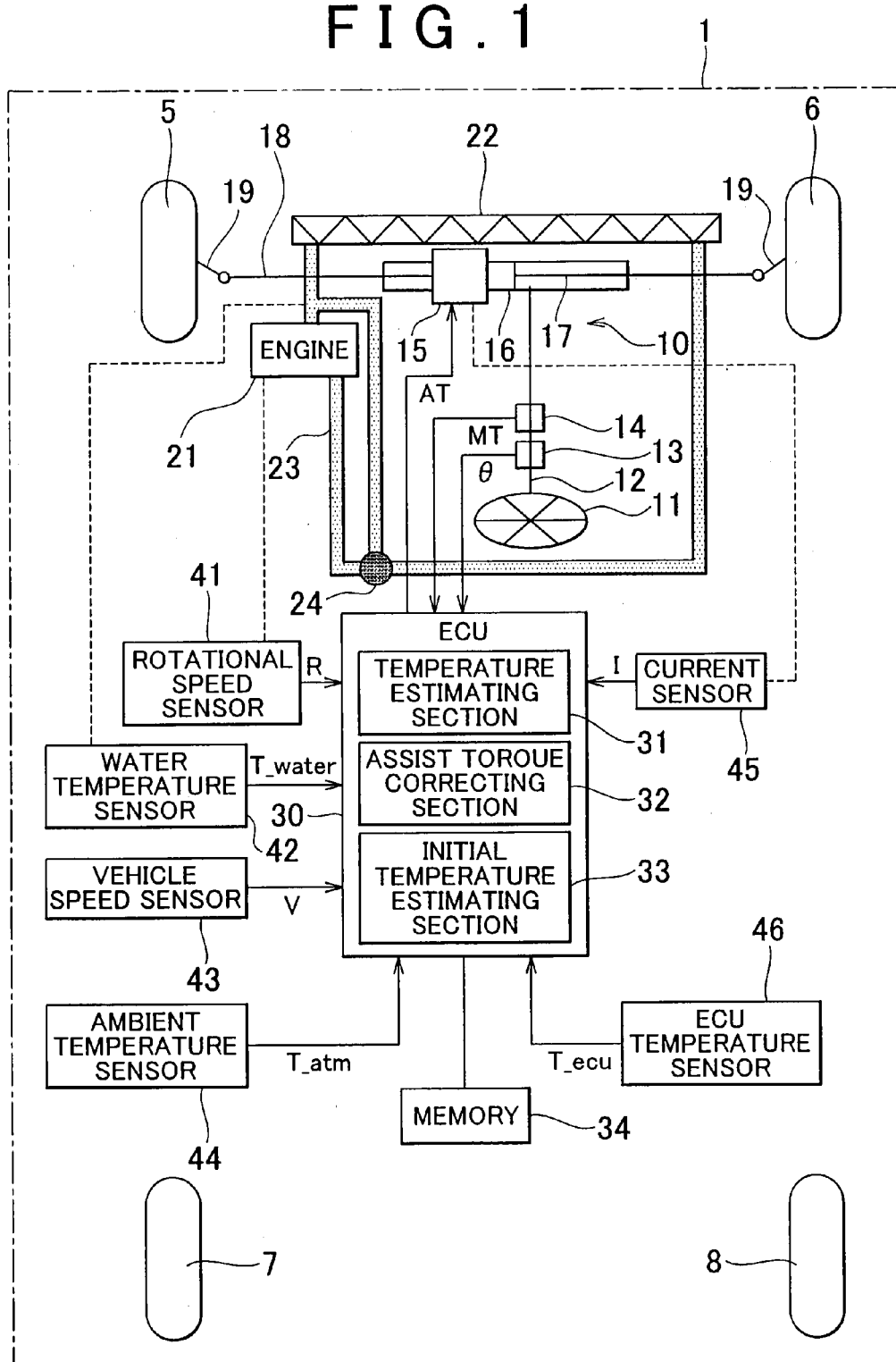
FIG. 1 is a general configuration diagram conceptually illustrating an embodiment of a vehicle steering control system according to the present invention.

Referring to FIG. 1, the basic configuration of an embodiment of a vehicle steering control system according to the present invention is described. FIG. 1 is a general configuration diagram conceptually illustrating an embodiment of a vehicle steering control system according to the present invention.

As shown in FIG. 1, a vehicle 1 has front wheels 5 and 6, and rear wheels 7 and 8. At least either the front wheels 5 and 6 or the rear wheels 7 and 8 are driven by driving force from an engine 21, and the front wheels 5 and 6 are steerable to enable the vehicle 1 to travel in a desired direction.

The front wheels 5 and 6 are steered by an electric power steering device 10 which is driven in response to the operation of a steering wheel 11 by the driver. More specifically, the electric power steering device 10 is a rack coaxial type electric power steering device, for example. The electric power steering device 10 has a steering shaft 12 having one end connected to the steering wheel 11; a rack-pinion mechanism 17 connected to the other end of the steering shaft 12 (or connected to a pinion shaft connected to the other end of the steering shaft 12); a steering angle sensor 13 for detecting a steering angle θ, as a rotational angle, of the steering wheel 11; a torque sensor 14 for detecting a steering torque MT applied to the steering shaft 12 by operation of the steering wheel 11; and an electric motor 15 for generating an assist steering force to reduce the steering effort of the driver and applying the assist steering force to a rack bar 18 via a reduction gear 16.

In the electric power steering device 10, an ECU 30 calculates a steering assist torque AT, as a torque to be generated by the electric motor 15, based on the steering angle θ output from the steering angle sensor 13 and the steering torque MT output from the torque sensor 14.

The steering assist torque AT is output from the ECU 30 to the electric motor 15, and a current I proportional to the steering assist torque AT is supplied to the electric motor 15 to drive the electric motor 15. A steering assist force is thereby applied to the steering shaft 12 from the electric motor 15, and, as a result, the required steering effort is reduced. Also, the force in the direction of rotation of the electric motor 15 is converted into a force in the direction of reciprocation (in other words, transaltory direction) of the rack bar 18 by the rack-pinion mechanism 17. More specifically, the force in the direction of rotation of the electric motor 15 is converted into a force in the direction of reciprocation of the rack bar by a ball screw or the like in the rack-pinion mechanism 17. Both ends of the rack bar 18 are connected to the front wheels 5 and 6, respectively, via tie rods 19, and the direction of the front wheels 5 and 6 are changed by the reciprocating motion of the rack bar 18.

The vehicle 1 is also provided with a engine speed sensor 41 for detecting the engine speed R of the engine 21; a coolant temperature sensor 42 for detecting a coolant temperature T_water of coolant for cooling the engine 21; a vehicle speed sensor 43 for detecting a vehicle speed V; an ambient temperature sensor 44 for detecting an ambient temperature T_atm; a current sensor 45 for detecting a current I for driving the electric motor 15; and an ECU temperature sensor 46 for detecting an ECU temperature T_ecu as the temperature of the ECU 30.

The viscosity of grease applied to a gear mechanism, including the reduction gear 16 and the rack-pinion mechanism 17, increases with decreasing temperature. Then, the preloads of the gear mechanism increases, and, as a result, the steering wheel 11 becomes more difficult to turn, which results in deterioration of the steering feel for the driver.

Therefore, in this embodiment, a gear temperature T_gear as the temperature of the gear mechanism, which includes the reduction gear 16, the rack-pinion mechanism 17 and so on, is estimated, and the steering assist torque AT is corrected to prevent degradation of the steering feel when the estimated gear temperature T_gear is equal to or below a prescribed temperature T_thr1. The estimation of the gear temperature T_gear is made based on the engine speed R detected by the engine speed sensor 41, the coolant temperature T_water detected by the coolant temperature sensor 42, the vehicle speed V detected by the vehicle speed sensor 43, the ambient temperature T_atm detected by the ambient temperature sensor 44, the current I detected by the current sensor 45, and the ECU temperature T_ecu detected by the ECU temperature sensor 46. The estimation of the gear temperature T_gear and the correction of the steering assist torque AT are described in detail below.

Figure 2:
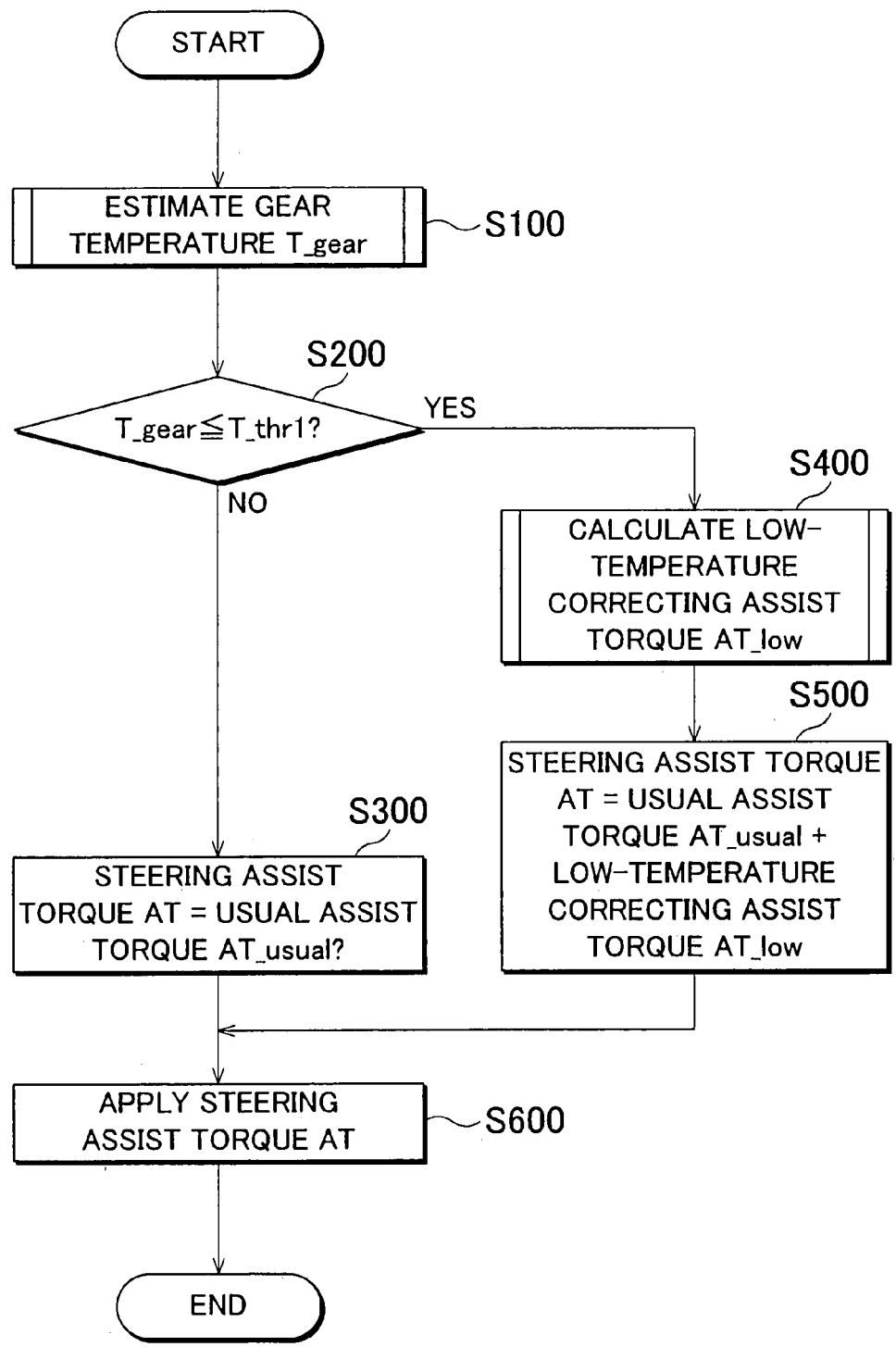
FIG. 2 is a flowchart conceptually illustrating the overall flow of the operation of the electric power steering device according to the embodiment.

(2) Principle of operation: Referring next to FIG. 2 to FIG. 14, the operation of the electric power steering device 10 according to this embodiment is described in more detail. Here, while the overall flow of the operation of the electric power steering device 10 according to this embodiment is described with reference to FIG. 2, a more detailed explanation is provided with reference to FIG. 4 to FIG. 14 as needed. FIG. 2 is a flowchart conceptually illustrating the overall flow of the operation of the electric power steering device 10 according to this embodiment.

As shown in FIG. 2, the gear temperature $T\_gear$ is first estimated by operation of a temperature estimating section 31 as a block logically formed in the ECU 30 (step S100). The estimation of the gear temperature $T\_gear$ is described in detail later (see FIG. 4 to FIG. 11).

Then, it is determined whether the gear temperature $T\_gear$ estimated in step S100 is equal to or below a prescribed threshold $T\_thr1$ (step S200).

If the gear temperature $T\_gear$ is determined to be not equal to or lower than the prescribed threshold $T\_thr1$ in step S200 (NO in step S200), a usual normal torque $AT\_usual$ calculated based on the steering angle θ and the steering torque MT is set as the steering assist torque AT (step S300). That is, Steering assist torque AT=Usual assist torque $AT\_usual$.

Figure 3:
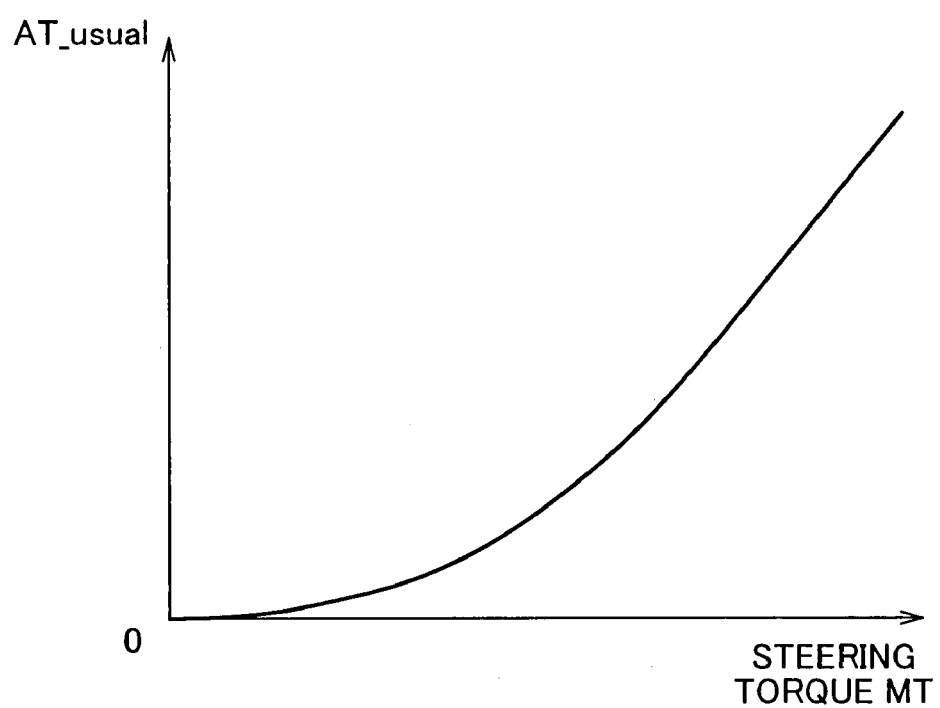
FIG. 3 is a graph conceptually showing the calculation of the normal assist torque.

Here, referring to FIG. 3, the calculation of the normal assist torque $AT\_usual$ is described. FIG. 3 is a graph conceptually showing the calculation of the normal assist torque $AT\_usual$.

As shown in FIG. 3, the normal assist torque $AT\_usual$ is calculated based on a graph showing the relation between the steering torque MT and the normal assist torque $AT\_usual$. More specifically, as the steering torque MT is higher, a larger normal assist torque $AT\_usual$ is calculated.

The graph showing the relation between the steering torque MT and the normal assist torque $AT\_usual$ in FIG. 3 is one specific example, and the normal assist torque $AT\_usual$ may be calculated using another graph showing the relation between the steering torque MT and the normal assist torque $AT\_usual$. Alternatively, the normal assist torque $AT\_usual$ may be calculated using a graph showing the relation between the steering angle θ (or the steering angular speed dθ), in addition to or instead of the steering torque MT, and the normal assist torque $AT\_usual$.

Referring again to FIG. 2, a current I proportional to the normal assist torque $AT\_usual$ as the steering assist torque AT is then supplied to the electric motor 15 to drive the electric motor 15. As a result, the normal assist torque $AT\_usual$ as the steering assist torque AT is applied to the steering shaft 12 (step S600).

If the gear temperature $T\_gear$ is determined to be equal to or lower than the prescribed threshold temperature $T\_thr1$ in step S200 (YES in step S200), a low-temperature correcting assist torque $AT\_low$ is calculated by operation of an assist torque correcting section 32 as a block logically formed in the ECU 30 (step S400). The calculation of the low-temperature correcting assist torque $AT\_low$ is described in detail later (see FIG. 12 and FIG. 13).

After that, a torque value obtained by adding the low-temperature correcting assist torque $AT\_low$, calculated in step S400, to the normal assist torque $AT\_usual$ is set as the ["final" or "corrected"?] steering assist torque AT (step S500). That is, the ["final" or "corrected"?] steering assist torque AT=normal assist torque $AT\_usual$+low-temperature correcting assist torque $AT\_low$. Then, a current I proportional to the sum of the normal assist torque $AT\_usual$ and the low-temperature correcting assist torque $AT\_low$ is supplied to the electric motor 15 to drive the electric motor 15. As a result, the sum of the usual assist torque $AT\_usual$ and the low-temperature correcting assist torque $AT\_low$ as the steering assist torque AT is applied to the steering shaft 12 (step S600).

Figure 4:
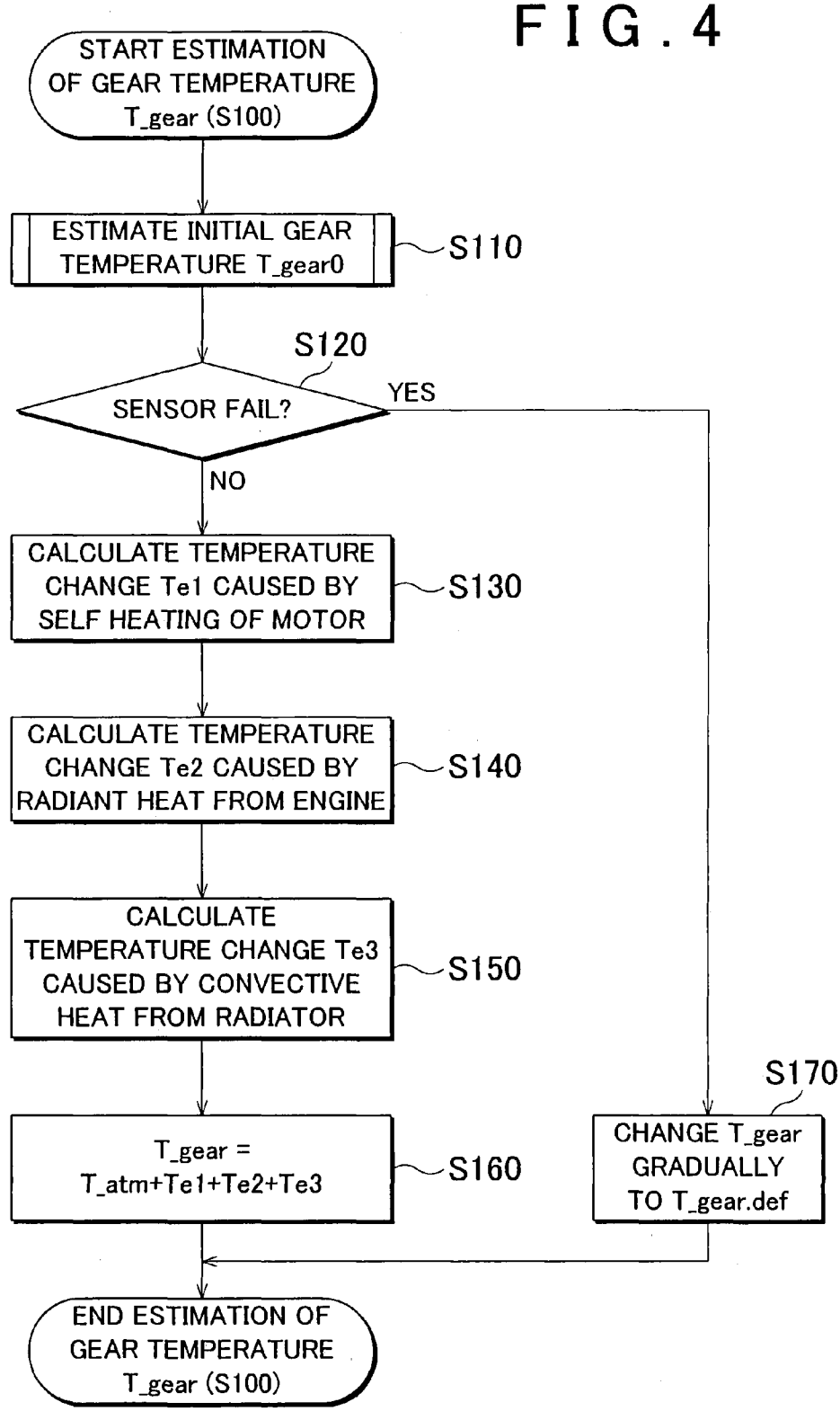
FIG. 4 is a flowchart conceptually illustrating the flow of the estimation of a gear temperature in step S100 in FIG. 2.

Referring next to FIG. 4, the estimation of the gear temperature $T\_gear$ in step S100 in FIG. 2 is described. FIG. 4 is a flowchart conceptually illustrating the flow of the estimation of the gear temperature $T\_gear$ in step S100 in FIG. 2.

As shown in FIG. 4, the initial gear temperature $T\_gear0$, which is the temperature of the gear mechanism, is estimated when the engine 21 is started (that is, when the ignition switch is turned ON) (step S110).

Figure 5:
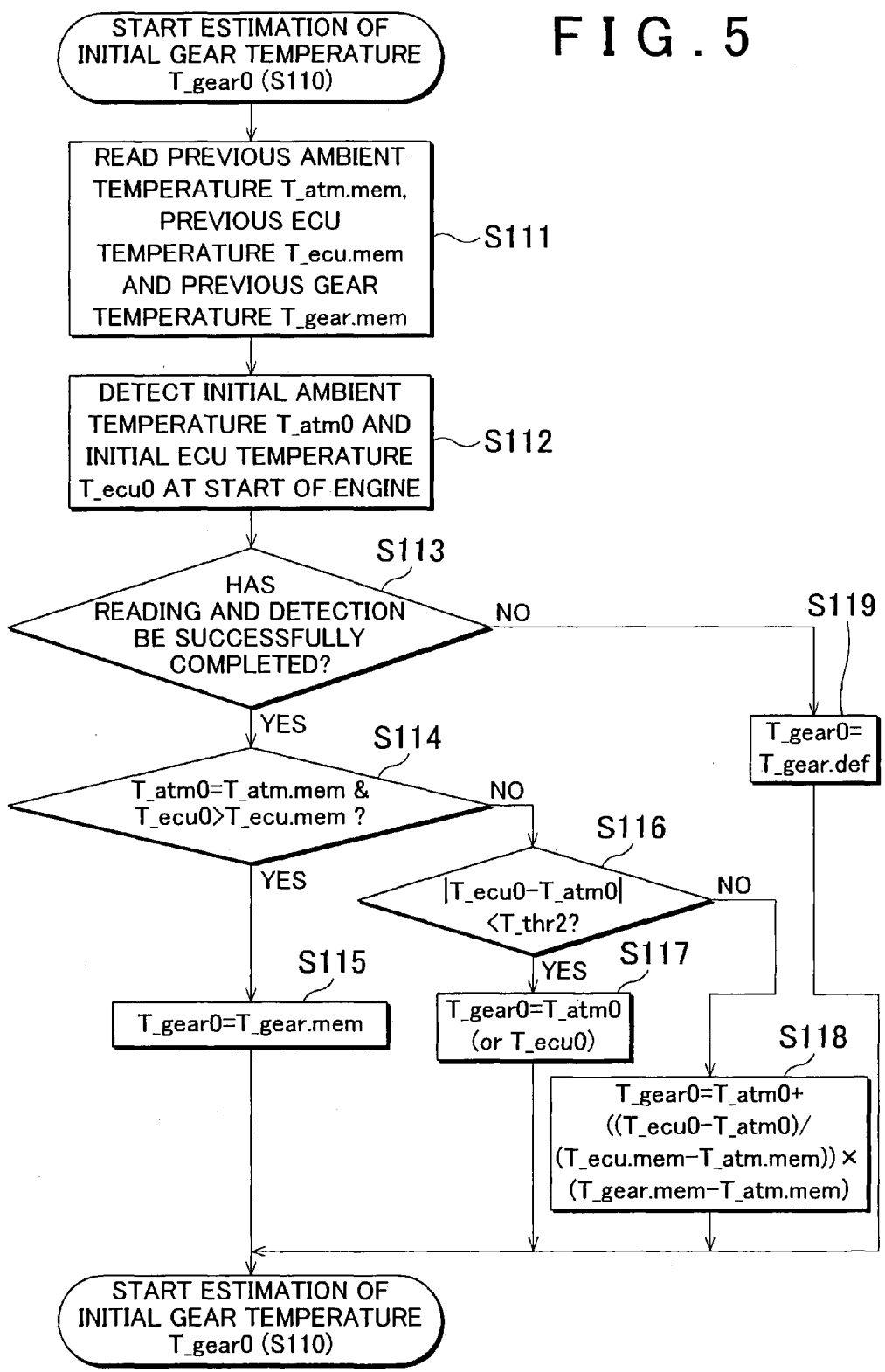
FIG. 5 is a flowchart conceptually illustrating the flow of estimation of an initial gear temperature in step S110 in FIG. 4.

Here, referring to FIG. 5, the estimation of the initial gear temperature $T\_gear0$ in step S110 in FIG. 4 is described. FIG. 5 is a flowchart conceptually illustrating the flow of estimation of the initial gear temperature $T\_gear0$ in step S110 in FIG. 4.

As shown in FIG. 5, a previous ambient temperature $T\_atm.mem$ as the ambient temperature $T\_atm$ that was last detected while the engine 21 was previously being driven (in other words, that was last detected before the ignition switch was last turned OFF), a previous ECU temperature $T\_ecu.mem$ as the ECU temperature $T\_ecu$, which is the temperature of the ECU 30 that was last detected while the engine 21 was previously being driven, and a previous gear temperature $T\_gear.mem$ as the gear temperature $T\_gear$ that was last estimated while the engine 21 was previously being driven are read from a memory 34 by operation of an initial temperature estimating section 33 as a block logically formed in the ECU 30 (step S111). To enable this operation, at least the ambient temperature $T\_atm$, the ECU temperature $T\_ecu$ and the gear temperature $T\_gear$ may be recorded in the memory 34 whenever detected or estimated.

Then, an initial ambient temperature $T\_atm0$, which is the ambient temperature $T\_atm$ at a time when the engine 21 is started, and an initial ECU temperature $T\_ecu0$, which is the ECU temperature $T\_ecu$ at a time when the engine 21 is started, are detected (step S112).

After that, it is determined whether the reading of the previous ambient temperature $T\_atm.mem$, ECU temperature $T\_ecu.mem$ and gear temperature $T\_gear.mem$ in step S111 and the detection of the initial ambient temperature $T\_atm0$ and the initial ECU temperature $T\_ecu0$ in step S112 were successfully completed (step S113).

If it is determined in step S113 that the reading in step S111 or the detection in step S112 was not successively completed (NO in step S113), the initial gear temperature $T\_gear0$ cannot be estimated through the operations in step S114 to step S118 described below. Therefore, a gear temperature $T\_gear.def$ set by default is set as the initial gear temperature $T\_gear0$ (step S119). That is, the initial gear temperature $T\_gear0$ is regarded as equal to the gear temperature $T\_gear.def$ set by default. The default gear temperature $T\_gear.def$ may be stored in advance in, for example, the memory 34.

When the reading in step S111 or the detection in step S112 were not successively completed, the reading in step S111 and the detection in step S112 may be performed once again instead of setting the gear temperature $T\_gear.def$ set by default as the initial gear temperature $T\_gear0$.

The default gear temperature $T\_gear.def$ may be greater than the threshold temperature $T\_thr1$ so that the correction of the steering assist torque AT, which is performed when the gear temperature $T\_gear$ is low, may not be performed. In other words, the default gear temperature $T\_gear.def$ may be greater than the threshold temperature $T\_thr1$ to avoid a state where the correction of the steering assist torque AT is inevitably performed when the gear temperature T_gear is set to the default gear temperature T_gear.def.

If it is determined in step S113 that the reading in step S111 or the detection in step S112 were successively completed (YES in step S113), it is then determined whether the initial ambient temperature T_atm0 is equal to the previous ambient temperature T_atm.mem and whether the initial ECU temperature T_ecu0 is higher than the previous ECU temperature T_ecu.mem (step S114).

If it is determined in step S114 that the initial ambient temperature T_atm0 is equal to the previous ambient temperature T_atm.mem and that the initial ECU temperature T_ecu0 is higher than the previous ECU temperature T_ecu.mem (YES in step S114), it can be determined that the time period between when the ignition switch was last turned OFF and when the ignition switch was turned ON this time is short (for example, several seconds, several dozens of seconds, or several minutes). This determination can be explained by the following reason. Because the ECU 30 is positioned above the engine 21 in the engine room, the ECU temperature T_ecu increases because of the heat from the engine 21 for a certain period of time after the ignition switch has been turned OFF. Then, as the heat from the engine 21 decreases, the ECU temperature T_ecu also decreases. Therefore, if the time period between when the ignition switch was last turned OFF and when the ignition switch was turned ON this time is short, the ECU temperature T_ecu has increased. In addition, if there is no change in the ambient temperature T_atm, it is considered that the environment around the vehicle 1 had not changed until the ignition switch was turned ON this time since the ignition switch was last turned OFF. Therefore, when the initial ambient temperature T_atm0 is equal to the previous ambient temperature T_atm.mem and the initial ECU temperature T_ecu0 is higher than the previous ECU temperature T_ecu.mem, it can be determined that the time period between when the ignition switch was last turned OFF and when the ignition switch was turned ON this time is short.

In this case, it is considered that the gear temperature T_gear had not changed significantly until the ignition switch was turned ON this time since the ignition switch was last turned OFF. That is, it is considered that there is little or almost no difference between the gear temperature T_gear and the previous gear temperature T_gear.mem. Therefore, in this case, the previous gear temperature T_gear.mem is set as the initial gear temperature T_gear0 (step S115). That is, it is estimated that the initial gear temperature T_gear0 is equal to the previous gear temperature T_gear.mem.

If it is determined that the initial ambient temperature T_atm0 is not equal to the previous ambient temperature T_atm.mem or that the initial ECU temperature T_ecu0 is not higher than the previous ECU temperature T_ecu.mem as a result of the determination in step S114 (step S114: No), it is then determined whether or not the absolute value of the difference between the initial ECU temperature T_ecu0 and the initial ambient temperature T_atm0 is smaller than a prescribed second threshold temperature T_thr2 (for example, several ° C.) (step S116). In other words, it is determined whether or not the initial ECU temperature T_ecu0 and the initial ambient temperature T_atm0 can be regarded as almost or generally equal to each other. In this case, if the difference between the initial ECU temperature T_ecu0 and the initial ambient temperature T_atm0 is several ° C. (for example, 0° C. to 5° C.), the initial ECU temperature T_ecu0 and the initial ambient temperature T_atm0 may be regarded as almost or generally equal to each other.

If it is determined in step S116 that the absolute value of the difference between the initial ECU temperature T_ecu0 and the initial ambient temperature T_atm0 is smaller than the prescribed second threshold temperature T_thr2 as a result of the determination (YES in step S116), it can be determined that the time period between when the ignition switch was last turned OFF and when the ignition switch was turned ON this time is long (for example, several dozens of hours, several days or several dozens of days). That is, it is considered that the initial ambient temperature T_atm0 and the initial ECU temperature T_ecu0 are almost or generally equal to each other because the time period between when the ignition switch was last turned OFF and when the ignition switch was turned ON this time is long enough to cool the ECU 30 sufficiently.

In this case, it is considered that the reduction gear 16 and the rack-pinion mechanism 17 have been also sufficiently cooled. Therefore, the higher of the initial ambient temperature T_atm0 and the initial ECU temperature T_ecu0 is set as the initial gear temperature T_gear0 (step S117). That is, it is estimated that the initial gear temperature T_gear0 is equal to the higher of the initial ambient temperature T_atm0 and the initial ECU temperature T_ecu0.

The second threshold temperature T_thr2 may be set as described below in view of the fact that it is used to determine that the time period between when the ignition switch was last turned OFF and when the ignition switch was turned ON this time is long. In general, the higher the vehicle speed V is, the larger amount of air flows into the engine room. As a result, the inside of the engine room is cooled more strongly by air. In this case, the difference between the ECU temperature T_ecu and the ambient temperature T_atm decreases. Therefore, when the second threshold temperature T_thr2 is excessively large, the absolute value of the difference between the initial ECU temperature T_ecu0 and the initial ambient temperature T_atm0 may be smaller than the second threshold temperature T_thr2 when the ignition switch was turned OFF after running at a relatively high speed and then the ignition switch was turned ON within a short period of time (for example, several seconds or several minutes). Such a situation is not desirable because it adversely affects the accuracy of the determination on whether the time period between when the ignition switch was last turned OFF and when the ignition switch was turned ON this time is long. Therefore, the second threshold T_thr2 may be set to a value smaller than the absolute value of the difference between the ECU temperature T_ecu and the ambient temperature T_atm when the vehicle 1 is running at a relatively high speed.

If it is determined in step S116 that the absolute value of the difference between the initial ECU temperature T_ecu0 and the initial ambient temperature T_atm0 is not smaller than the prescribed second threshold T_thr2 (NO in step S116), the initial gear temperature T_gear0 is estimated based on the assumption that the ratio among the previous gear temperature T_gear.mem, the previous ambient temperature T_atm.mem and the previous ECU temperature T_ecu.mem is equal to the ratio among the initial gear temperature T_gear0, the initial ambient temperature T_atm0 and the initial ECU temperature T_ecu0 (step S118). More specifically, the initial gear temperature T_gear0 is estimated based on the equation: $(T\_ecu0-T\_atm0)/(T\_ecu.mem-T\_atm.mem)=(T\_gear0-T\_atm0)/(T\_gear.mem-T\_atm.mem)$. From the equation, it is estimated that the initial gear temperature T_gear0 is equal to $T\_atm0+((T\_ecu0-T\_atm0)/(T\_ecu.mem-T\_atm.mem))\times(T\_gear.mem-T\_atm.mem)$.

Referring again to FIG. 4, it is then determined whether or not the sensors on the vehicle 1 are malfunctioning (step S120). More specifically, it is determined whether or not at least one of the engine speed sensor 41, the coolant temperature sensor 42, the vehicle speed sensor 43 and the ambient temperature sensor 44 is malfunctioning.

If it is determined that the sensors on the vehicle 1 are malfunctioning (that is, at least one of the engine speed sensor 41, the coolant temperature sensor 42, the vehicle speed sensor 43 and the ambient temperature sensor 44 is in a fail state) as a result of the determination in step S120 (step S120: Yes), the gear temperature T_gear is set to change gradually to the default gear temperature T_gear.def (step S170). This terminates the correction of the steering assist torque AT smoothly for safety reasons when any of the sensors malfunction.

If it is determined that the sensors on the vehicle 1 are not malfunctioning (that is, none of the engine speed sensor 41, the coolant temperature sensor 42, the vehicle speed sensor 43 and the ambient temperature sensor 44 are in a fail state) as a result of the determination in step S120 (step S120: No), a change Te1 in the gear temperature T_gear caused by self-heating of the electric motor 15 is then calculated (step S130).

Referring now to FIG. 6, the calculation of the change Te1 in the gear temperature T_gear caused by self-heating of the electric motor 15 is described. FIG. 6 is a graph conceptually illustrating the change Te1 in the gear temperature T_gear caused by self-heating of the electric motor 15.

As shown in FIG. 6, the change Te1 in the gear temperature T_gear caused by self-heating of the electric motor 15 is determined according to the magnitude of the current I supplied to drive the electric motor 15. More specifically, when the current I is increased, the self-heating of the electric motor 15 increases. As a result, the change Te1 in the gear temperature T_gear increases. When the current I is decreased, the self-heating of the electric motor 15 decreases. As a result, the change Te1 in the gear temperature T_gear decreases. When the current I is zero, the self-heating of the electric motor 15 is zero.

Therefore, the change Te1 in the gear temperature T_gear caused by self-heating of the electric motor 15 is calculated according to the elapsed time t after the start of the engine 21 based on the graph shown in FIG. 6.

The relation between the current I and the change Te1 (for example, the amount of variation in the change Te1 with variation in the current I) differs depending on the characteristics of the electric motor 15. Therefore, the relation between the current I and the change Te1 may be set for each vehicle 1 in which the electric power steering device 10 is equipped experimentally, empirically, mathematically or logically, or using simulation or the like, taking the characteristics of the electric motor 15 incorporated in the electric power steering device 10 into account.

In the graph shown in FIG. 6, the change Te1 is expressed as a function of the elapsed time t after the start of the engine 21 in conformity with the calculations of a change Te2 in the gear temperature T_gear caused by radiant heat from the engine 21 and a change Te3 in the gear temperature T_gear caused by convective heat from the radiator 22, which are describe later.

Referring again to FIG. 4, a change Te2 in the gear temperature T_gear caused by radiant heat from the engine 21 is calculated (step S140).

Referring now to FIG. 7, the calculation of the change Te2 in the gear temperature T_gear caused by radiant heat from the engine 21 is described. FIG. 7 is a graph conceptually illustrating the change Te2 in the gear temperature T_gear caused by radiant heat from the engine 21.

As shown in FIG. 7, the change Te2 in the gear temperature T_gear caused by radiant heat from the engine 21 is determined depending on the elapsed time t after the start of the engine 21. More specifically, the change Te2 in the gear temperature T_gear increases with the increase in the elapsed time after the start of the engine 21 for a certain period of time until a time period t1 elapses after the start of engine 21. The change Te2 in the gear temperature T_gear caused by radiant heat from the engine 21 is smaller than the other changes Te1 and Te3. Thus, even if the change Te2 in the gear temperature T_gear is regarded as proportional to the elapsed time after the start of engine 21 for a certain period of time until a time period t1 elapses after the start of engine 21, the accuracy of the estimation of the gear temperature T_gear is not deteriorated improperly. Therefore, for simplification of the calculation of the change Te2 in the gear temperature T_gear caused by radiant heat from the engine 21, the change Te2 in the gear temperature T_gear for the period of time until a time period t1 elapses after the start of engine 21 may be defined as a linear function of the elapsed time after the start of the engine 21. After the time period t1 has elapsed after the start of engine 21, the change Te2 in the gear temperature T_gear stays at a constant value Te2_1.

Therefore, the change Te2 in the gear temperature T_gear caused by radiant heat from the engine 21 is calculated according to the elapsed time t after the start of the engine 21 based on the graph shown in FIG. 7.

The relation between the elapsed time t after the start of the engine 21 and the change Te2 (for example, the shape of the graph (the gradient of the line, for example) shown in FIG. 7, namely, the values which the change Te2 can take depending on the elapsed time t) differs depending on the positional relation between the engine 21 and the gear mechanism, the characteristics of the engine 21, the characteristics of the gear mechanism, and so on. Therefore, the relation between the elapsed time t and the change Te2 after the start of the engine 21 may be set for each vehicle 1 in which the electric power steering device 10 is equipped experimentally, empirically, mathematically or logically, or using simulation or the like, taking the positional relation between the engine 21 and the gear mechanism, the characteristics of the engine 21 and the characteristics of the gear mechanism.

In this embodiment, the relation between the elapsed time t and the change Te2 after the start of the engine 21 is approximated using a linear function to simplify the calculation of the change Te2 in the gear temperature T_gear caused by radiant heat from the engine 21. However, the relation between the elapsed time t and the change Te2 after the start of the engine 21 may be approximated using another function (for example, a non-linear function) instead of approximating it by a linear function. Alternatively, the actual relation between the elapsed time t and the change Te2 after the start of the engine 21 may be used instead of approximating the relation between the elapsed time t and the change Te2 after the start of the engine 21 by a linear function. When the actual relation between the elapsed time t and the change Te2 after the start of the engine 21 is used, the calculation of the change Te2 is more accurate, and, consequently, the accuracy of the estimation of the gear temperature T_gear is improved.

Referring again to FIG. 4, a change Te3 in the gear temperature T_gear caused by convective heat from the radiator 22 is calculated (step S150).

Figure 8A:
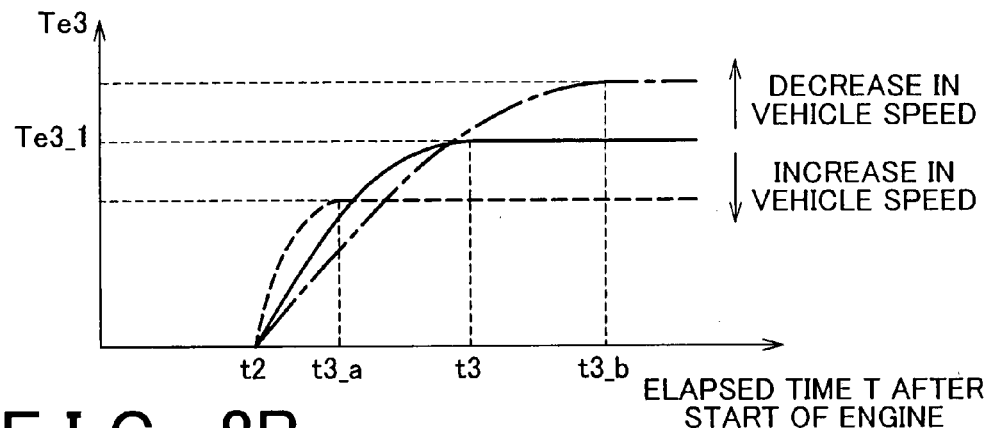
FIGS. 8A to 8C are graphs conceptually illustrating the amount of change in the gear temperature caused by convective heat from the radiator.
Figure 8B:
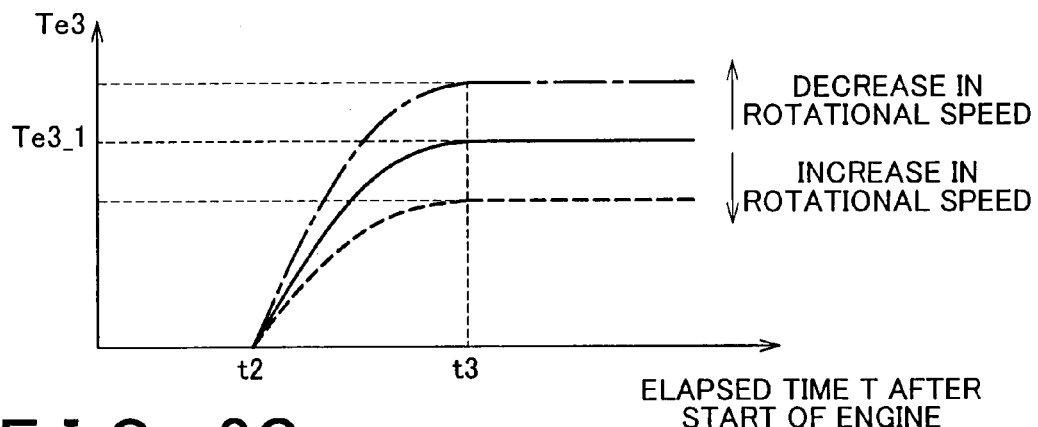
Figure 8C:
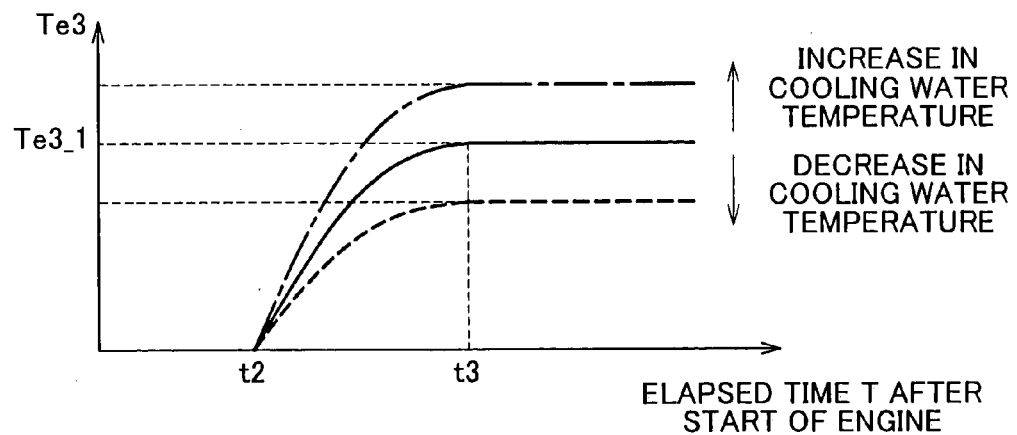
Figure 9A:
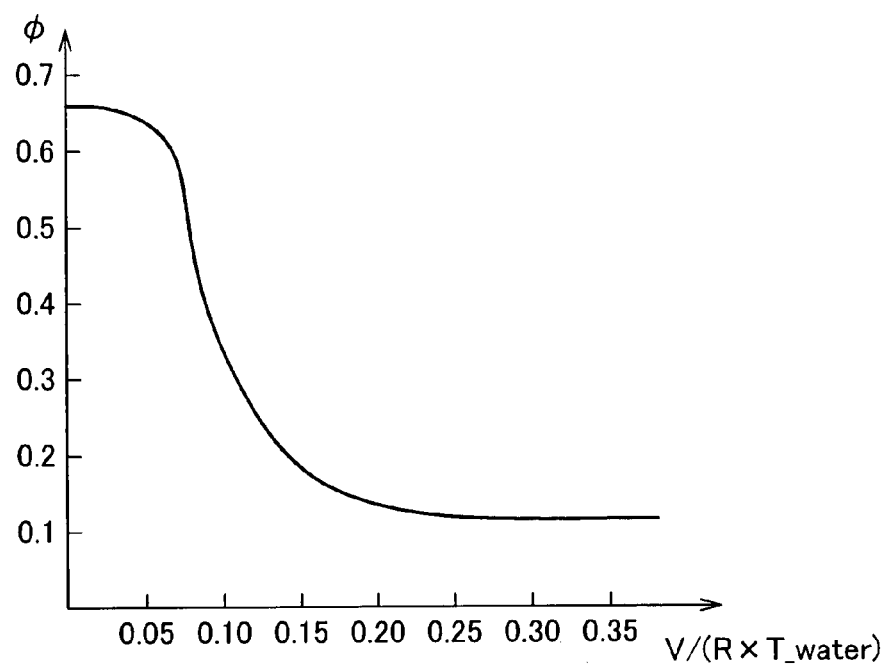
FIGS. 9A and 9B are graphs conceptually illustrating a temperature efficiency for use in estimating convective heat from the radiator.
Figure 9B:
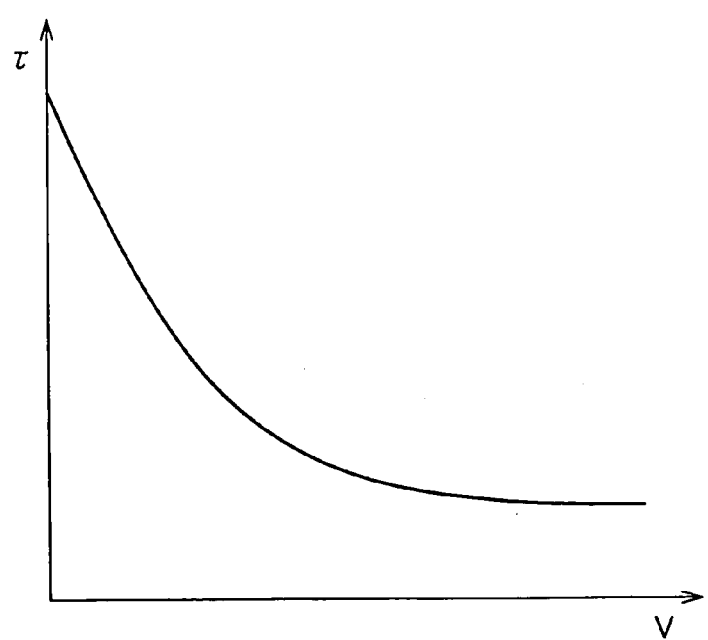
Figure 10:
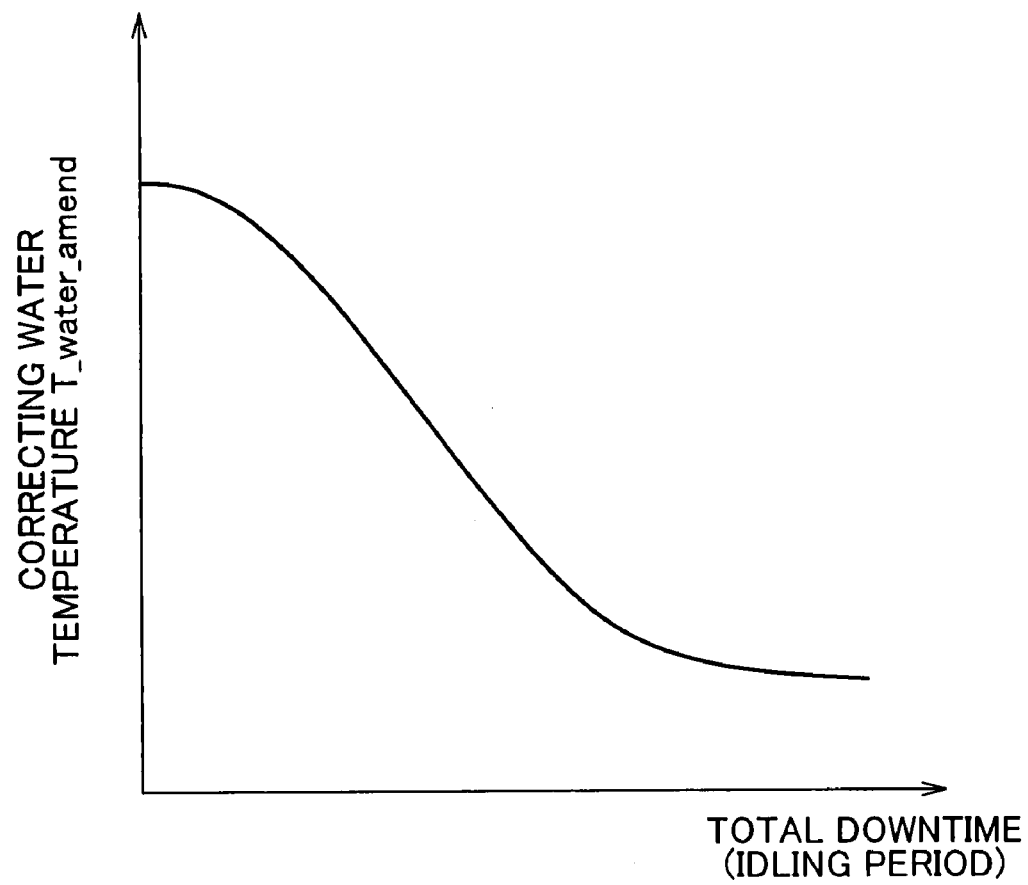
FIG. 10 is a graph conceptually illustrating a correction value for use in correcting the coolant temperature for use in estimating convective heat from the radiator.

Referring now to FIG. 8 to FIG. 10, the calculation of the change Te3 in the gear temperature T_gear caused by convective heat from the radiator 22 is described. FIGS. 8A to 8C are graphs conceptually illustrating the change Te3 in the gear temperature T_gear caused by convective heat from the radiator 22, FIGS. 9A and 9B are graphs conceptually illustrating a temperature efficiency Φ for use in estimating the convective heat from the radiator 22, and FIG. 10 is a graph conceptually illustrating a correction value for use in correcting the coolant temperature T_water for use in estimating the convective heat from the radiator 22.

As shown in FIGS. 8A to 8C, the change Te3 in the gear temperature T_gear caused by convective heat from the radiator 22 is influenced by the vehicle speed V, the engine speed R of the engine 21 and the coolant temperature T_water and determined depending on the elapsed time t after the start of the engine 21. More specifically, for a certain period of time until a time period t2 elapses after the start of the engine 21, the change Te3 in the gear temperature T_gear stays zero. After the time period t2 has elapsed after the start of the engine 21, the change Te3 in the gear temperature T_gear increases with the increase in the elapsed time after the start of the engine 21. Then, after a time period t3 (or t2_a or t2_b) has elapsed after the start of the engine 21, the change Te3 in the gear temperature T_gear stays at a constant value Te3_1. FIG. 8A shows the change Te3 in the gear temperature T_gear caused by convective heat from the radiator 22 against the vehicle speed V, FIG. 8B shows the change Te3 in the gear temperature T_gear caused by convective heat from the radiator 22, which depends on the engine speed R of the engine 21, and FIG. 8C shows the change Te3 in the gear temperature T_gear caused by convective heat from the radiator 22, which depends on the coolant temperature T_water.

The curves shown in FIG. 8A to 8C change depending on the temperature efficiency $\Phi$, which is determined according to the vehicle speed V, the engine speed R of the engine 21 and the coolant temperature T_water, and a time constant $\tau$ which is determined according to the vehicle speed V. More specifically, the curves shown in FIG. 8A to 8C may be expressed by, for example, the equation: $Te3=(\Phi \times (T\_water-T\_atm))/(\tau \times S+1)$. That is, in this embodiment, the change Te3 in the gear temperature T_gear caused by convective heat from the radiator 22 is estimated using the above equation.

As shown in FIG. 9A, the temperature efficiency $\Phi$ depends on the vehicle speed V, the engine speed R of the engine 21 and the coolant temperature T_water. When the vehicle speed V increases, the temperature efficiency $\Phi$ decreases. When the vehicle speed V decreases, the temperature efficiency $\Phi$ increases. When the engine speed R of the engine 21 increases, the temperature efficiency $\Phi$ increases. When the engine speed R of the engine 21 decreases, the temperature efficiency $\Phi$ decreases. When the coolant temperature T_water increases, the temperature efficiency $\Phi$ increases. When the coolant temperature T_water decreases, the temperature efficiency $\Phi$ decreases.

As shown in FIG. 9B, the time constant $\tau$ depends on the vehicle speed V. When the vehicle speed V increases, the time constant $\tau$ decreases. When the vehicle speed V decreases, the time constant $\tau$ increases.

More specifically, when the temperature efficiency $\Phi$ decreases, a constant value Te3_1 that the change Te3 takes after the time period t2 has elapsed after the start of the engine 21 becomes smaller than a constant value Te3_1 that the change Te3 takes before the temperature efficiency $\Phi$ decreases, and when the time constant $\tau$ increases, the rate of increase in the change Te3 becomes lower than the rate of increase in the change Te3 before the time constant $\tau$ increases (that is, the change Te3 increases relatively gently).

On the other hand, when the temperature efficiency $\Phi$ increases, a constant value Te3_1 that the change Te3 takes after the time period t2 has elapsed after the start of the engine 21 becomes smaller than a constant value Te3_1 which the change Te3 takes before the temperature efficiency $\Phi$ increases, and when the time constant $\tau$ decreases, the rate of increase in the change Te3 becomes higher than the rate of increase in the change Te3 before the time constant $\tau$ decreases (that is, the change Te3 increases relatively rapidly).

When the influences of the vehicle speed V, the engine speed R of the engine 21 and the coolant temperature T_water on the change Te3 in the gear temperature T_gear caused by convective heat from the radiator 22 shown in FIG. 8A to 8C are shown individually based on the temperature efficiency $\Phi$ shown in FIG. 9A and the time constant $\tau$ shown in FIG. 9B, the following explanation holds true.

First, as shown in FIG. 8A, when the vehicle speed V decreases, the flow rate of air flowing through the radiator 22 decreases and the time for a unit amount of air to pass through the radiator 22 increases. Thus, an increase in the temperature of the air passing through the radiator 22 is promoted. Also, because the amount of air convecting around the gear mechanism decreases with the decrease in the vehicle speed V, the rate of increase in the change Te3 of the gear temperature T_gear decreases. That is, when the temperature efficiency $\Phi$ and the time constant $\tau$ increase with decreasing the vehicle speed V, the rate of increase of the constant value of the change Te3 of the gear temperature T_gear decreases.

On the other hand, when the vehicle speed V increases, the flow rate of air flowing through the radiator 22 increases and the time for a unit amount of air to pass through the radiator 22 decreases. Thus, an increase in the temperature of the air passing through the radiator 22 is suppressed. Also, because the amount of air convecting around the gear mechanism increases with the increase in the vehicle speed V, the rate of increase in the change Te3 of the gear temperature T_gear increases. That is, when the temperature efficiency $\Phi$ and the time constant $\tau$ decrease with an increase in the vehicle speed V, the constant value of the change Te3 of the gear temperature T_gear decreases but the rate of increase therein increases.

As shown in FIG. 8B, when the engine speed R of the engine 21 increases, the amount of coolant flowing into the radiator 22 increases. Thus, a large amount of heat relative to a unit amount of air passing through the radiator 22 is supplied, and an increase in the air temperature is promoted.

On the other hand, when the engine speed R of the engine 21 decreases, the amount of coolant flowing into the radiator 22 decreases. Thus, a small amount of heat relative to a unit amount of air passing through the radiator 22 is supplied, and an increase in the air temperature is suppressed.

As shown in FIG. 8C, when the coolant temperature T_water increases, a large amount of heat relative to a unit amount of air passing through the radiator 22 is supplied, and the air temperature increases.

On the other hand, when the coolant temperature T_water decreases, a small amount of heat relative to a unit amount of air passing through the radiator 22 is supplied, and an increase in the air temperature is suppressed.

Here, as the coolant temperature T_water to be taken into account when the temperature efficiency $\Phi$ is calculated, the temperature of coolant in a coolant pipe 23 from the engine 21 to the radiator 22 detected by the coolant temperature sensor 42 (that is, coolant before being cooled in the radiator 22) is used. However, the temperature of coolant passing through a thermostat 24 provided in a coolant pipe 23 from the radiator 22 to the engine 21 (that is, coolant after being cooled in the radiator 22) (in other words, the temperature of the thermostat 24) may be used instead of the above coolant temperature.

Here, when the thermostat 24 is located adjoining or in the vicinity of the point of detection by the coolant temperature sensor 42, the coolant temperature T_water detected by the coolant temperature sensor 42 and the temperature of coolant passing through the thermostat 24 may be regarded as generally equal to each other. When the thermostat 24 is located away from the point where the coolant as a target of detection by the coolant temperature sensor 42 flows, it is not preferred to regard the coolant temperature T_water detected by the coolant temperature sensor 42 and the temperature of coolant passing through the thermostat 24 as generally equal to each other in terms of the reliability of the coolant temperature (that is, in terms of the reliability of the change Te3 of the gear temperature T_gear caused by convective heat from the radiator 22). Therefore, when the thermostat 24 is located away from the point where the coolant as a target of detection by the coolant temperature sensor 42 flows, correction may performed on the coolant temperature T_water detected by coolant temperature sensor 42 and the corrected coolant temperature may be set as the coolant temperature T_water to be taken into account when the change Te3 is calculated.

More specifically, as the idling period increases, the coolant temperature T_water detected by the coolant temperature sensor 42 and the temperature of the coolant passing through the thermostat 24 tend to be equal to each other. As the idling period decreases, the difference between the coolant temperature T_water detected by the coolant temperature sensor 42 and the temperature of coolant passing through the thermostat 24 increases. More specifically, the coolant temperature T_water becomes higher than the temperature of coolant passing through the thermostat 24. Therefore, by subtracting a larger correction amount from the coolant temperature T_water as the idling period decreases, the coolant temperature T_water, from which the correction amount has been subtracted, becomes closer to the temperature of coolant passing through the thermostat 24. On the other hand, as the idling period increases, the coolant temperature T_water, from which the correction amount has been subtracted, becomes closer to the temperature of coolant passing through the thermostat 24 even if a large correction amount is not subtracted from the coolant temperature T_water.

Therefore, a correcting coolant temperature T_water_amend determined according to the idling period based on the graph shown in FIG. 10 may be subtracted from the coolant temperature T_water detected by the coolant temperature sensor 42. That is, "T_water−T_water_amend" may be set as the coolant temperature T_water to be taken into account when the temperature efficiency $\Phi$ is calculated.

The graph shown in FIG. 10 shows a curve based on which a larger correcting coolant temperature T_water_amend is set as the idling period decreases and a relatively smaller correcting coolant temperature T_water_amend is set as the idling period increases.

Referring again to FIG. 4, a temperature value obtained by adding the change Te1 calculated in step S130, the change Te2 calculated in step S140 and the change Te3 calculated in step S150 to the current ambient temperature T_atm is estimated as the current gear temperature T_gear (step S160).

Figure 11A:
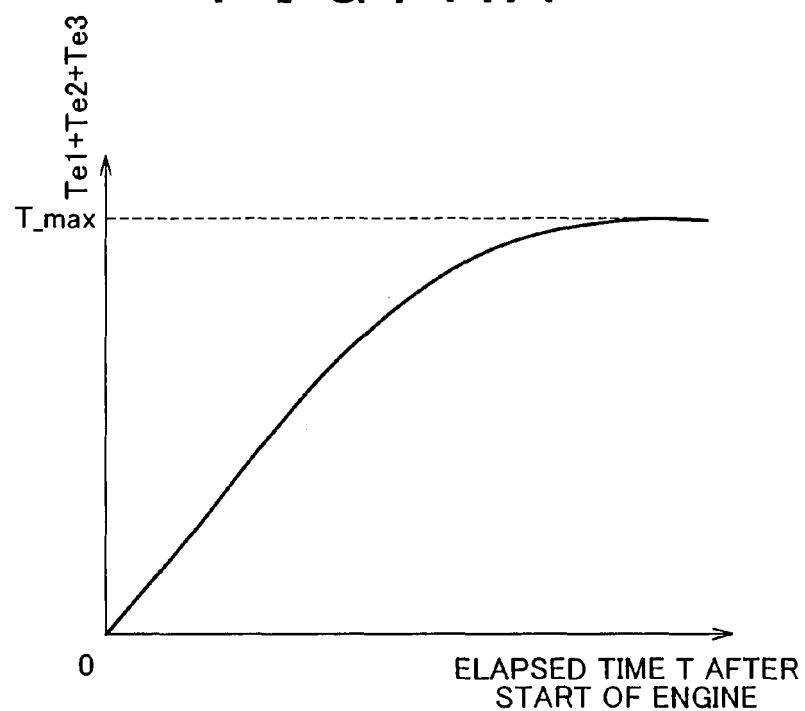
FIGS. 11A and 11B are graphs conceptually illustrating the operation to estimate a gear temperature taking an initial gear temperature into account.
Figure 11B:
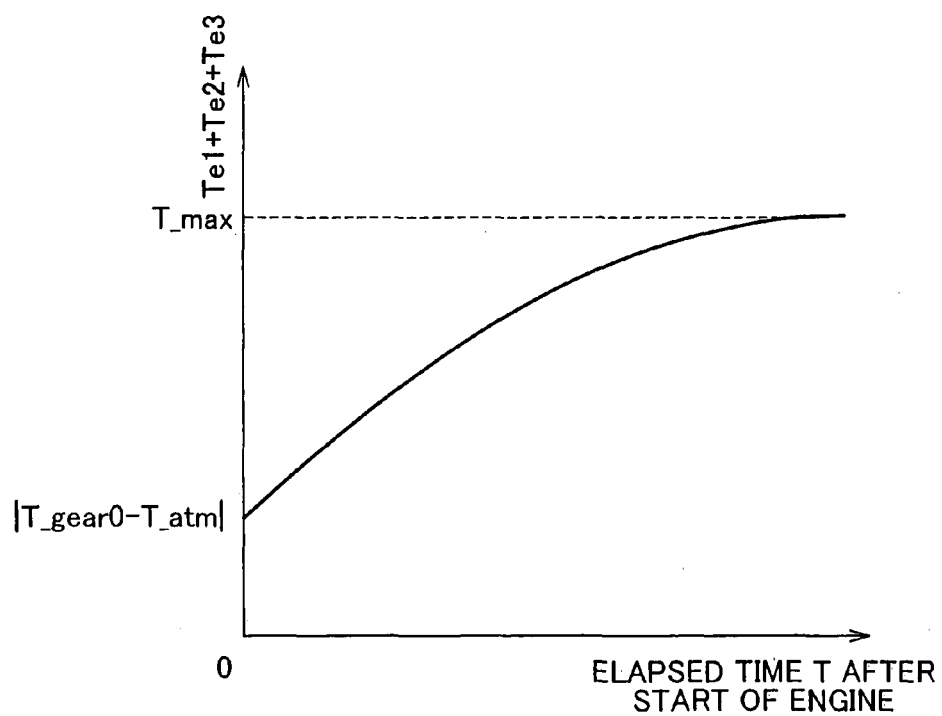

Here, when the current gear temperature T_gear is estimated in step S160, the initial gear temperature T_gear0 estimated in step S110 may be taken into account in addition to adding the change Te1 calculated in step S130, the change Te2 calculated in step S140 and the change Te3 calculated in step S150 to the current ambient temperature T_atm. The operation to estimate the gear temperature T_gear taking the initial gear temperature T_gear0 into account is described with reference to FIGS. 11A and 11B. FIGS. 11A and 11B are graphs conceptually illustrating the operation to estimate the gear temperature T_gear taking the initial gear temperature T_gear0 into account.

The graph in FIG. 11A shows the sum of the change Te1, the change Te2 and the change Te3 (that is, Te1+Te2+Te3, namely, the sum of the curves shown in FIG. 6, FIG. 7 and FIG. 8) to be added to the current ambient temperature T_atm. When the current ambient temperature T_atm and the initial gear temperature T_gear0 are equal to each other, the current gear temperature T_gear can be calculated by adding the sum of the changes in the gear temperature T_gear calculated from the graph shown in FIG. 11A to the current ambient temperature T_atm.

On the other hand, when the current ambient temperature T_atm and the initial gear temperature T_gear0 are not equal to each other, the sum of the change Te1, the change Te2 and the change Te3 already includes a change corresponding to the difference between the current ambient temperature T_atm and the initial gear temperature T_gear0. Thus, in this case, as shown in FIG. 11B, the curve of the sum of the change Te1, the change Te2 and the change Te3 needs to be corrected such that an initial value of the sum of the change Te1, the change Te2 and the change Te3 (that is, a change immediately after the start of the engine 21) will be equal to the difference between the current ambient temperature T_atm and the initial gear temperature T_gear0. However, even after the correction, the sum of the change Te1, the change Te2 and the change Te3 still has a constant value T_max after a certain period of time has passed after the start of the engine 21. That is, correction to change the rate of increase in the sum of the change Te1, the change Te2 and the change Te3 with an increase in the elapsed time t after the start of the engine 21 is performed with an initial value of the sum of the change Te1, the change Te2 and the change Te3 maintained equal to the difference between the current ambient temperature T_atm and the initial gear temperature T_gear0.

Instead of correcting the curve of the sum of the change Te1, the change Te2 and the change Te3, one of the curves shown in FIG. 6, FIG. 7 and FIG. 8 may be corrected in advance such that an initial value of one of the curves will be equal to the difference between the current ambient temperature T_atm and the initial gear temperature T_gear0. Alternatively, at least two of the curves shown in FIG. 6, FIG. 7 and FIG. 8 may be corrected in advance such that the sum of initial values of the at least two of the curves shown in FIG. 6, FIG. 7 and FIG. 8 will be equal to the difference between the current ambient temperature T_atm and the initial gear temperature T_gear0.

Referring next to FIG. 12 and FIG. 13, the calculation of the low-temperature correcting assist torque AT_low in step S400 in FIG. 2 is described. FIG. 12 shows graphs for use in calculating an assist torque AT_low0 for use in calculating the low-temperature correcting assist torque AT_low, and FIG. 13 is a graph for use in calculating a gain AT_low_gain by which the assist torque AT_low0 is multiplied when the low-temperature correcting assist torque AT_low is calculated.

Figure 12A:
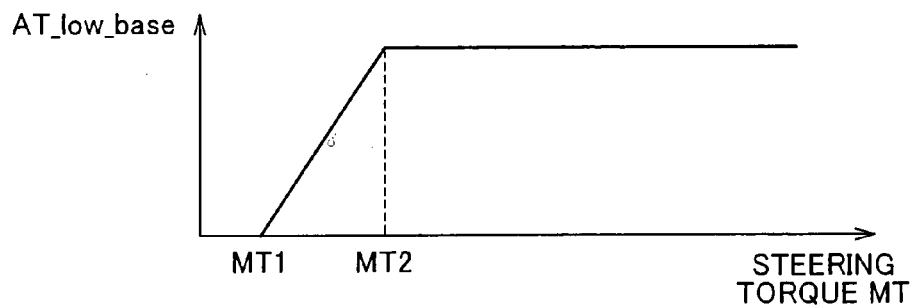
FIGS. 12A to 12D are graphs for use in calculating an assist torque for use in calculating a low-temperature correcting assist torque.

First, a basic assist torque AT_low_base for correction is calculated based on the graph shown in FIG. 12A. More specifically, when the steering torque MT is relatively low, the basic assist torque AT_low_base is calculated as 0 to ensure that the steering wheel 11 has some play. After the steering torque MT exceeds a prescribed value MT1, a larger basic assist torque AT_low_base is calculated as the steering torque MT increases. When the steering torque MT is greater than a prescribed value MT2, a constant basic assist torque AT_low_base, which is not varied irrespective of the change in the steering torque MT, is calculated.

Figure 12B:
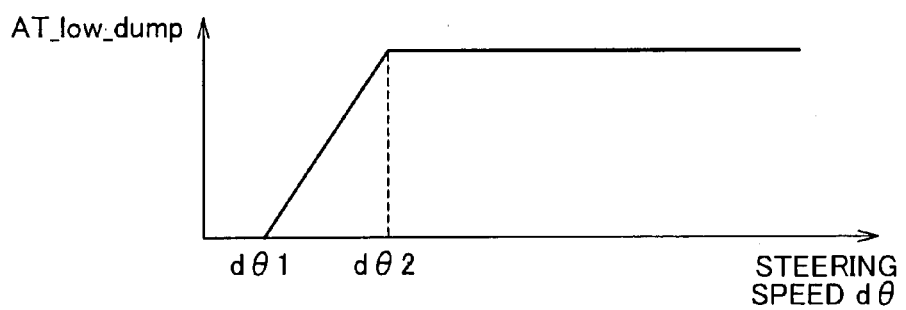

In addition, based on the graph shown in FIG. 12B, an assist torque AT_low_dump for preventing deterioration of the steering feel relating to reverse damping is calculated.

More specifically, when the steering speed (that is, the steering angular speed) dθ is relatively low, the assist torque AT_low_dump is calculated as 0. After the steering speed dθ exceeds a prescribed value dθ1, a higher assist torque AT_low_dump is calculated as the steering speed dθ increases. After the steering speed dθ exceeds a prescribed value dθ2, a constant assist torque AT_low_dump, which is not varied irrespective of the change in the steering speed dθ, is calculated.

Figure 12C:
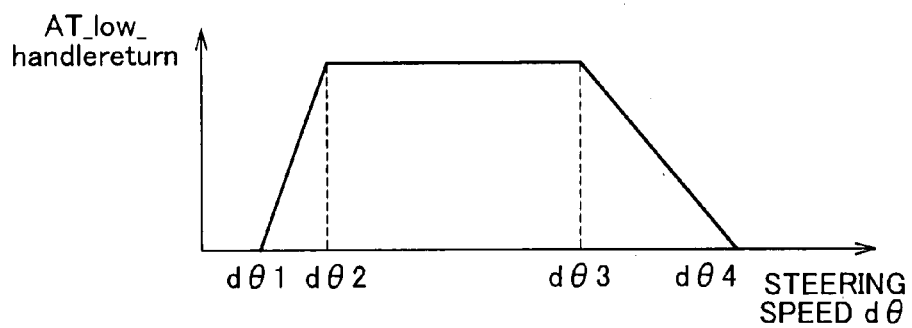

In addition, based on the graph shown in FIG. 12C, an assist torque AT_low_handlereturn for preventing deterioration of the steering feel relating to handle returning is calculated. More specifically, when the steering speed (that is, the steering angular speed) dθ is relatively low, the assist torque AT_low_handlereturn is calculated as 0. After the steering speed dθ exceeds a prescribed value dθ1, a higher assist torque AT_low_handlereturn is calculated as the steering speed dθ increases. After the steering speed dθ exceeds a prescribed value dθ2, a constant assist torque AT_low_handlereturn, which is not varied irrespective of the change in the steering speed dθ, is calculated. After the steering speed dθ exceeds a prescribed value dθ3, a lower assist torque AT_low_handlereturn is calculated as the steering speed dθ increases. After the steering speed dθ exceeds a prescribed value dθ4, the assist torque AT_low_handlereturn is calculated as 0.

Figure 12D:
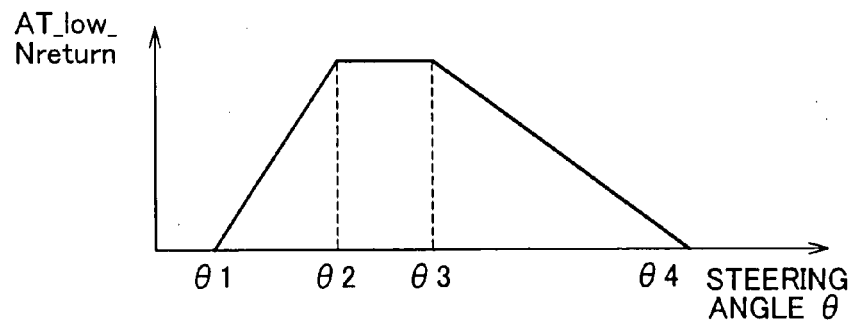

In addition, based on the graph shown in FIG. 12D, an assist torque AT_low_Nreturn for preventing deterioration of the steering feel relating to N-returning. More specifically, when the steering angle θ is relatively low, the assist torque AT_low_Nreturn is calculated as 0. After steering angle θ exceeds a prescribed value θ1, a higher assist torque AT_low_Nreturn is calculated as the steering angle θ increases. After steering angle θ exceeds a prescribed value steering angle θ2, a constant assist torque AT_low_Nreturn, which is not varied irrespective of the change in the steering angle θ, is calculated. After steering angle θ exceeds a prescribed value θ3, a lower assist torque AT_low_Nreturn is calculated as the steering angle θ increases. After the steering angle θ exceeds a prescribed value θ4, the assist torque AT_low_Nreturn is calculated as 0.

The sum of the basic assist torque AT_low_base, the assist torque AT_low_dump, the assist torque AT_low_handlereturn and the assist torque AT_low_Nreturn calculated as described above is an assist torque AT_low0 for use in calculating the low-temperature correcting assist torque AT_low. That is, AT_low0=AT_low_base+AT_low_dump+AT_low_handlereturn+AT_low_Nreturn.

In addition, based on the graph shown in FIG. 13, a gain AT_low_gain by which the assist torque AT_low0 calculated based on FIG. 12A to FIG. 12D is multiplied is calculated. More specifically, if the gear temperature T_gear estimated in step S100 in FIG. 2 is low, the value of the gain AT_low_gain to be calculated is increased. If the gear temperature T_gear estimated in step S100 in FIG. 2 is high, the value of the gain AT_low_gain to be calculated is decreased.

The value of the gear temperature T_gear at which the gain AT_low_gain is zero corresponds to the threshold T_thr1 used in step S200 in FIG. 2.

Then, the assist torque AT_low0 calculated based on FIG. 12A to FIG. 12D is multiplied by the gain AT_low_gain calculated based on the graph in FIG. 13 to calculate the low-temperature correcting assist torque AT_low. That is, AT_low=AT_low0×AT_low_gain.

As described above, according to this embodiment, when the gear temperature T_gear is relatively low, a steering assist torque AT obtained by adding the low-temperature correcting assist torque AT_low to the normal assist torque AT_usual is applied. That is, a greater steering assist torque AT than the normal assist torque AT_usual is applied. Therefore, even when the preload of the gear mechanism increases with an increase in the viscosity of the grease applied to the gear mechanism, a steering assist torque AT which can cancel the increase in the preload is applied. Therefore, degradation of the steering feel for the driver can be prevented.

In particular, when the low-temperature correcting assist torque AT_low is calculated, the assist torque for preventing deterioration of damping, deterioration of the handle returnability and deterioration of N-returnability due to the increase in the preload of the gear mechanism is taken into account. Therefore, degradation of the steering feel for the driver can be prevented more effectively.

Here, the prevention of degradation of steering feel for the driver is described in detail with reference to FIG. 14. FIG. 14 is a graph in which the torque of the steering wheel 11 in the case where the low-temperature correcting assist torque AT_low according to this embodiment is added and the torque of the steering wheel 11 in the case where the low-temperature correcting assist torque AT_low according to this embodiment is not added are shown in relation to the gear temperature T_gear.

As shown in FIG. 14, when the low-temperature correcting assist torque AT_low according to this embodiment is added (that is, when a low-temperature control is performed), the torque the driver is required to apply to steer the steering wheel 11 at a low temperature is less than that where the low-temperature correcting assist torque AT_low is not added (that is, when a low-temperature control is not performed). Because the steering assist torque AT is applied to cancel the increase in the preload at a low temperature as described above, degradation of steering feel for the driver can be prevented.

In addition, instead of providing a sensor or the like for directly detecting the gear temperature T_gear, the gear temperature T_gear is estimated using various parameters detectable in the existing hardware configuration (that is, the engine speed R detected by the engine speed sensor 41, the coolant temperature T_water detected by the coolant temperature sensor 42, the vehicle speed V detected by the vehicle speed sensor 43, the ambient temperature T_atm detected by the ambient temperature sensor 44, the current I detected by the current sensor 45, and the ECU temperature T_ecu detected by the ECU temperature sensor 46). Therefore, the costs relating to the expense and space necessary to employ this embodiment can be reduced.

Moreover, because various factors that affect the gear temperature T_gear (that is, the ambient temperature T_atm, the self-heating of the electric motor 15, the radiant heat from the engine 21 and the convective heat from the radiator 22 mentioned before) are taken into account when the gear temperature T_gear is estimated, the accuracy of the estimation of the gear temperature T_gear can be improved. Therefore, the preload, which increases at a low temperature, can be estimated with high accuracy and the steering assist torque AT, which can cancel the increased preload effectively, may be applied. As a result, degradation of steering feel can be prevented more effectively.

To ensure the effect of the electric power steering device 10 according to this embodiment to prevent degradation of steering feel at a low temperature, the threshold T_thr1 may be determined based on the temperature at which the preload of the gear mechanism begins to increase with an increase in the viscosity of the grease or the like applied to the gear mechanism. For example, the temperature at which the preload of the gear mechanism begins to increase with an increase in the viscosity of the grease or the like applied to the gear part may be determined as the threshold T_thr1. Alternatively, the temperature at which the preload of the gear mechanism increases by a predetermined amount with an increase in the viscosity of the grease or the like applied to the gear part may be determined as the threshold T_thr1.

The coolant temperature T_water does not necessarily have to be detected. In this case, the gear temperature T_gear may be estimated using a coolant temperature T_water estimated from the engine speed R.

In the above embodiment, the ECU temperature T_ecu is detected using the ECU temperature sensor 46. However, when the vehicle 1 has a temperature sensor for detecting the temperature of the electric motor 15, for example, the temperature of the electric motor 15 may be used as the ECU temperature T_ecu instead of the ECU temperature T_ecu.

While an example in which the present invention is applied to a rack coaxial type electric power steering device is described in the above embodiment, the effects described above can be also achieved when the present invention is applied to electric power steering devices (for example, column assist type or rack assist type electric power steering devices).

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle steering control system for controlling operation of an electric vehicle steering device which applies a steering assist force to a steering mechanism via a gear mechanism, comprising:
   a temperature estimating section for estimating a gear temperature as a temperature of the gear mechanism or around the gear mechanism; and
   a correcting section for correcting the steering assist force according to the estimated gear temperature,
   wherein the temperature estimating section estimates the gear temperature based on convective heat from a radiator or based on self-heating of an electric motor that applies the steering assist force or based on radiant heat from the internal combustion engine or based on ambient temperature,
   wherein the correcting section corrects the steering assist force by adding a low-temperature correcting assist force determined according to the gear temperature to a normal assist force, which is applied when the gear temperature is above a prescribed temperature, and
   wherein the prescribed value of the gear temperature is a temperature at which the preload of the gear mechanism begins to increase.

2. A vehicle steering control system for controlling operation of an electric vehicle steering device which applies a steering assist force to a steering mechanism via a gear mechanism, comprising:
   a temperature estimating section for estimating a gear temperature as a temperature of the gear mechanism or around the gear mechanism based on a difference between a temperature of a control unit that controls the operation of the vehicle steering device and an ambient temperature; and
   a correcting section for correcting the steering assist force according to the estimated gear temperature,
   wherein the temperature estimating section estimates that the gear temperature is equal to the gear temperature that is last estimated while an internal combustion engine is previously being driven, in a case where the ambient temperature at a time when the internal combustion engine is started is equal to the ambient temperature that is last detected while the internal combustion engine is previously being driven, and the temperature of the control unit at the time when the internal combustion engine is started is higher than the temperature of the control unit that is last detected while the internal combustion engine is previously being driven.

3. A vehicle steering control system for controlling operation of an electric vehicle steering device which applies a steering assist force to a steering mechanism via a gear mechanism, comprising:
   a temperature estimating section for estimating a gear temperature as a temperature of the gear mechanism or around the gear mechanism based on a difference between a temperature of a control unit that controls the operation of the vehicle steering device and an ambient temperature; and
   a correcting section for correcting the steering assist force according to the estimated gear temperature,
   wherein the temperature estimating section estimates that the gear temperature is equal to the ambient temperature at a time when the internal combustion engine is started, or the temperature of the control unit at the time when the internal combustion engine is started, in a case where an absolute value of a difference between the ambient temperature at the time when the internal combustion engine is started and the temperature of the control unit at the time when the internal combustion engine is started is smaller than a prescribed threshold.

4. A vehicle steering control system for controlling operation of an electric vehicle steering device which applies a steering assist force to a steering mechanism via a gear mechanism, comprising:
   a temperature estimating section for estimating a gear temperature as a temperature of the gear mechanism or around the gear mechanism based on a difference between a temperature of a control unit that controls the operation of the vehicle steering device and an ambient temperature; and
   a correcting section for correcting the steering assist force according to the estimated gear temperature,
   wherein the temperature estimating section estimates that the gear temperature is equal to a value obtained by an equation, the ambient temperature at a time when the internal combustion engine is started+{(the temperature of the control unit at the time when the internal combustion engine is started−the ambient temperature at the time when the internal combustion engine is started)/(the temperature of the control unit that is last detected while the internal combustion engine is previously being driven−the ambient temperature that is last detected while the internal combustion engine is previously being driven)×(the gear temperature that is last estimated while the internal combustion engine is previously being driven−the ambient temperature that is last detected while the internal combustion engine is previously being driven)}, in a case where an absolute value of a difference between the ambient temperature at the time when the internal combustion engine is started and the temperature of the control unit at the time when the internal combustion engine is started is equal to or larger than a prescribed threshold.

5. The vehicle steering control system according to claim 2, wherein the temperature estimating section corrects the estimated gear temperature based on convective heat from a radiator.

6. The vehicle steering control system according to claim 5, wherein the temperature estimating section corrects the estimated gear temperature by estimating an amount of change in the gear temperature caused by the convective heat from the radiator based on at least one of an engine speed, a vehicle speed and a coolant temperature as a temperature of cooling water for cooling the internal combustion engine.

7. The vehicle steering control system according to claim 2, wherein the temperature estimating section corrects the estimated gear temperature based on self-heating of an electric motor that applies the steering assist force.

8. The vehicle steering control system according to claim 7, wherein the temperature estimating section corrects the estimated gear temperature by estimating an amount of change in the gear temperature caused by self-heating of the electric motor based on an amount of current supplied to the electric motor.

9. The vehicle steering control system according to claim 2, wherein the temperature estimating section corrects the estimated gear temperature based on radiant heat from the internal combustion engine.

10. The vehicle steering control system according to claim 9, wherein the temperature estimating section corrects the estimated gear temperature by estimating an amount of change in the gear temperature caused by the radiant heat from the internal combustion engine based on elapsed time after start of the internal combustion engine.

11. A vehicle steering control system for controlling operation of an electric vehicle steering device which applies a steering assist force to a steering mechanism via a gear mechanism, comprising:
   a temperature estimating section for estimating a gear temperature as a temperature of the gear mechanism or around the gear mechanism; and
   a correcting section for correcting the steering assist force according to the estimated gear temperature,
   wherein the temperature estimating section estimates the gear temperature based on convective heat from a radiator or based on self-heating of an electric motor that applies the steering assist force or based on radiant heat from the internal combustion engine or based on ambient temperature
   wherein the correcting section corrects the steering assist force when the gear temperature is less than a predetermined temperature,
   wherein the correcting section corrects the steering assist force by adding a low-temperature assist force to a normal assist force, the low-temperature assist force is determined according to the gear temperature and the normal assist force is applied when the gear temperature is above the predetermined temperature, and
   wherein the low-temperature assist force is calculated by multiplying a base low-temperature assist torque by a correcting gain, the correcting gain is based on the gear temperature and the correcting gain equals zero if the gear temperature equals the predetermined temperature.

12. The vehicle steering control system according to claim 11, wherein the base low-temperature assist torque is a sum of a first assist torque based on a steering torque applied to a steering shaft, a second assist torque for preventing deterioration of steering feel related to reverse damping based on a steering speed, a third assist torque for preventing deterioration of steering feel related to handle returning based on the steering speed, and a fourth assist torque for preventing deterioration of steering feel related to N-returning based on a steering angle.

13. The vehicle steering control system according to claim 12, wherein the first assist torque equals zero for a first steering torque, increases linearly between the first steering torque and a second steering torque and remains constant when the steering torque is equal to or greater than the second steering torque.

14. The vehicle steering control system according to claim 12, wherein the second assist torque equals zero for a first steering speed, increases linearly between the first steering speed and a second steering speed and remains constant when the steering speed is equal to or greater than the second steering speed.

15. The vehicle steering control system according to claim 12, wherein the third assist torque equals zero for a first steering speed, increases linearly between the first steering speed and a second steering speed, remains constant between the second steering speed and a third steering speed, decreases linearly between the third steering speed and a fourth steering speed, and equals zero at the fourth steering speed.

16. The vehicle steering control system according to claim 12, wherein the fourth assist torque equals zero for a first steering angle, increases linearly between the first steering angle and a second steering angle, remains constant between the second steering angle and a third steering angle, decreases linearly between the third steering angle and a fourth steering angle, and equals zero at the fourth steering angle.

* * * * *